United States Patent
Qian et al.

(10) Patent No.: US 10,315,288 B2
(45) Date of Patent: Jun. 11, 2019

(54) CARBONATE-CATALYZED POLYCRYSTALLINE DIAMOND ELEMENTS, METHODS OF MANUFACTURING THE SAME, AND APPLICATIONS THEREFOR

(71) Applicant: US SYNTHETIC CORPORATION, Orem, UT (US)

(72) Inventors: Jiang Qian, Cedar Hills, UT (US); C. Eugene McMurray, Galion, OH (US); Debkumar Mukhopadhyay, Sandy, UT (US); Jason K. Wiggins, Draper, UT (US); Michael A. Vail, Genola, UT (US); Kenneth E. Bertagnolli, Riverton, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 478 days.

(21) Appl. No.: 15/040,818

(22) Filed: Feb. 10, 2016

(65) Prior Publication Data
US 2016/0158918 A1    Jun. 9, 2016

Related U.S. Application Data

(63) Continuation of application No. 13/552,052, filed on Jul. 18, 2012, now Pat. No. 9,273,381.
(Continued)

(51) Int. Cl.
*B24D 3/10* (2006.01)
*B22F 7/06* (2006.01)
(Continued)

(52) U.S. Cl.
CPC .............. *B24D 3/10* (2013.01); *B22F 7/062* (2013.01); *B24D 18/0009* (2013.01);
(Continued)

(58) Field of Classification Search
CPC . B24D 3/00; B24D 18/00; B24D 3/06; B24D 18/0009; E21B 10/46; E21B 10/55; E21B 10/56; E21B 10/567; B01J 3/06
See application file for complete search history.

(56) References Cited

U.S. PATENT DOCUMENTS

| 5,135,061 | A |   | 8/1992 | Newton, Jr. |
| 6,248,447 | B1 | * | 6/2001 | Griffin ................. C04B 37/021 175/434 |

(Continued)

FOREIGN PATENT DOCUMENTS

JP    2003226578    8/2003

OTHER PUBLICATIONS

U.S. Appl. No. 61/509,823, filed Jul. 20, 2011, Qian et al.
(Continued)

*Primary Examiner* — Alexandra M Moore
(74) *Attorney, Agent, or Firm* — Dorsey & Whitney LLP

(57) ABSTRACT

In an embodiment, a polycrystalline diamond compact includes a substrate and a preformed polycrystalline diamond table bonded to the substrate. The table includes bonded diamond grains defining interstitial regions. The table includes an upper surface, a back surface bonded to the substrate, and at least one lateral surface extending therebetween. The table includes a first region extending inwardly from the upper surface and the lateral surface. The first region exhibits a first interstitial region concentration and includes at least one interstitial constituent disposed therein, which may be present in at least a residual amount and includes at least one metal carbonate and/or at least one metal oxide. The table includes a second bonding region adjacent to the substrate that extends inwardly from the back surface. The second bonding region exhibits a second interstitial region concentration that is greater than the first (Continued)

interstitial region concentration and includes a metallic infiltrant therein.

21 Claims, 20 Drawing Sheets

Related U.S. Application Data

(60) Provisional application No. 61/509,823, filed on Jul. 20, 2011.

(51) Int. Cl.

| | | |
|---|---|---|
| *C22C 26/00* | (2006.01) | |
| *E21B 10/567* | (2006.01) | |
| *F16C 33/04* | (2006.01) | |
| *F16C 33/10* | (2006.01) | |
| *B24D 18/00* | (2006.01) | |
| *E21B 10/54* | (2006.01) | |
| *E21B 10/56* | (2006.01) | |
| *B01J 3/06* | (2006.01) | |
| *B22F 5/00* | (2006.01) | |

(52) U.S. Cl.
CPC .............. *C22C 26/00* (2013.01); *E21B 10/54* (2013.01); *E21B 10/56* (2013.01); *E21B 10/567* (2013.01); *F16C 33/043* (2013.01); *F16C 33/108* (2013.01); *B01J 3/06* (2013.01); *B22F 2005/001* (2013.01); *F16C 2352/00* (2013.01); *Y10T 408/89* (2015.01)

(56) References Cited

U.S. PATENT DOCUMENTS

| | | | |
|---|---|---|---|
| 6,338,754 B1 | 1/2002 | Cannon et al. | |
| 7,635,035 B1* | 12/2009 | Bertagnolli | B32B 9/00 |
| | | | 175/434 |
| 7,845,438 B1 | 12/2010 | Vail et al. | |
| 7,866,418 B2 | 1/2011 | Bertagnolli et al. | |
| 8,236,074 B1 | 8/2012 | Bertagnolli et al. | |
| 8,727,044 B2 | 5/2014 | Qian et al. | |
| 8,763,731 B2* | 7/2014 | Scott | B22F 3/14 |
| | | | 175/420.2 |
| 8,995,742 B1 | 3/2015 | Cooley et al. | |
| 9,062,505 B2 | 6/2015 | Chapman et al. | |
| 2006/0266558 A1 | 11/2006 | Middlemiss et al. | |
| 2009/0152015 A1* | 6/2009 | Sani | E21B 10/567 |
| | | | 175/420.2 |
| 2009/0152018 A1 | 6/2009 | Sani | |
| 2010/0212971 A1 | 8/2010 | Mukhopadhyay et al. | |
| 2013/0043078 A1 | 2/2013 | Qian et al. | |

OTHER PUBLICATIONS

Akaishi et al, "Physical and chemical properties of the heat resistant diamond compacts from diamond-magnesium carbonate system", Mater. Sci. and Eng. A 209 (1996) 54-59.

Akaishi et al., "Synthesis of polycrystalline diamond compact with magnesium carbonate and its physical properties", Diamond Relat. Mater. 5 (1996) 2-7.

Bex et al., "The influence of temperature and heating time on PCD performance", Ind. Diamond Rev. 44 (1984) 128-132.

Clark et al., "The use of PCD for petroleum and mining drilling" Ind. Diamond Rev. 1 (1999) 43-49.

Decker, "High-Pressure Calibration A Critical Review", J. Phys. Chem. Ref. Data, vol. 1, No. 3, 1972, pp. 1-79.

Hall, "Sintered Diamonds", Science, vol. 169, Aug. 28, 1970, pp. 1-2.

Hong et al., "High-pressure synthesis of heat-resistant diamond composite using a diamond-TiC0.6 powder mixture", J. Am. Ceram. Soc. 82 (9) (1999) 2497-2501.

International Search Report and Written Opinion from International Application No. PCT/US2012/047191 dated Nov. 5, 2012.

Lammer, "Mechanical properties of polycrystalline diamonds", The Institute of Metals (1988) 949-955.

Lin et al., "Superhard diamond/tungsten carbide nanocomposites", Appl. Phys. Lett. 98 (2011) 12914.

Nazarchuk et al., "The diamond-tungsten carbide polycrystalline composite material", J. Superhard Mater. 33 (2011) 1-12.

Qian et al., "High-pressure, high-temperature sintering of diamond-SiC composites by ball-milled diamond-Si mixtures", J. Mater. Res. 17 (2002) 2153-2160.

Rousse, "Structure of the intermediate phase of PbTe at high pressure", Physical Review B 71, 224116 (2005), pp. 1-6.

Scott, "The history and impact of synthetic diamond cutters and diamond enhanced inserts on the oil and gas industry", Ind. Diamond Rev. 1 (2006) 48-55.

Sneddon et al., "Polycrystalline diamond: manufacture, wear mechanisms, and implications for bit design", J. Petroleum Tech. 12 (1988) 1593-1601.

Sun et al., "Preferential oxidation of diamond {111}", J. Phys. D: Appl. Phys. 33 (2000) 2196-2199.

Titschack, "Magnesium quantification in calcites [(Ca,Mg)CO3] by Rietveld-based XRD analysis: Revisiting a well-established method", American Mineralogist, vol. 96, pp. 1028-1038, 2011.

Wentorf, "Sintered Superhard Materials", Science, vol. 208, No. 4446, Advanced Technology, May 23, 1980, pp. 872-880.

Westraadt et al., "Thermally stable polycrystalline diamond sintered with calcium carbonate", Diamond Relat. Mater. 16 (2007) 1929-1935.

U.S. Appl. No. 13/552,052, dated Jul. 1, 2015, Office Action.
U.S. Appl. No. 13/552,052, dated Oct. 27, 2015, Notice of Allowance.
U.S. Appl. No. 13/552,052, dated Feb. 10, 2016, Issue Notification.

\* cited by examiner

CARBONATE-CATALYZED POLYCRYSTALLINE DIAMOND ELEMENTS, METHODS OF MANUFACTURING THE SAME, AND APPLICATIONS THEREFOR

CROSS-REFERENCE TO RELATED APPLICATIONS

This application is a continuation of U.S. patent application Ser. No. 13/552,052 filed on 18 Jul. 2012, which claims priority to U.S. Provisional Application No. 61/509,823 filed on 20 Jul. 2011, the disclosure of each of which is incorporated herein, in its entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may also be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container with a volume of diamond particles positioned on a surface of the cemented carbide substrate. A number of such containers may be loaded into an HPHT press. The substrate(s) and volume of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a metal-solvent catalyst to promote intergrowth between the diamond particles, which results in the formation of a matrix of bonded diamond grains having diamond-to-diamond bonding therebetween, with interstitial regions between the bonded diamond grains being occupied by the metal-solvent catalyst.

The presence of the metal-solvent catalyst in the PCD table is believed to reduce the thermal stability of the PCD table at elevated temperatures. For example, chipping or cracking of the PCD table during drilling or cutting operations is believed to be due to the presence of the metal-solvent catalyst, which consequently can degrade the mechanical properties of the PCD table or cause failure. Additionally, some of the diamond grains can undergo a chemical breakdown or back-conversion to graphite via interaction with the solvent catalyst. At elevated high temperatures, portions of diamond grains may transform to carbon monoxide, carbon dioxide, graphite, or combinations thereof, causing degradation of the mechanical properties of the PCD table.

Despite the availability of a number of different PDCs, manufacturers and users of PDCs continue to seek PDCs that exhibit improved toughness, wear resistance, and thermal stability.

SUMMARY

Embodiments of the invention relate to PDCs including a PCD table sintered using at least one carbonate catalyst material having a bonding region with a relatively high interstitial region concentration that enables effective infiltration therein with a metallic infiltrant for bonding to a substrate, and methods of fabricating such PDCs. The PDCs disclosed herein may be used in a variety of applications, such as rotary drill bits, bearing apparatuses, wire-drawing dies, machining equipment, and other articles and apparatuses.

In an embodiment, a PDC includes a substrate and a preformed PCD table bonded to the substrate. The preformed PCD table includes bonded diamond grains defining a plurality of interstitial regions. The preformed PCD table further includes an upper surface, a back surface bonded to the substrate, and at least one lateral surface extending between the upper surface and the back surface. The preformed PCD table additionally includes a first region extending inwardly from the upper surface and the at least one lateral surface. The first region exhibits a first interstitial region concentration and includes at least one interstitial constituent disposed in at least a portion of the interstitial regions. The at least one interstitial constituent may be present in at least a residual amount. The at least one interstitial constituent includes at least one metal carbonate and/or at least one metal oxide. The preformed PCD table also includes a second bonding region adjacent to the substrate and extending inwardly from the back surface. The second bonding region exhibits a second interstitial region concentration that is greater than the first interstitial region concentration and includes a metallic infiltrant therein disposed in at least a portion of the interstitial regions.

In an embodiment, a method of fabricating a PDC is disclosed. The method includes assembling a preformed PCD table with a substrate. The preformed PCD table includes bonded diamond grains defining a plurality of interstitial regions. The preformed PCD table further includes an upper surface, a back surface bonded to the substrate, and at least one lateral surface extending between the upper surface and the back surface. The preformed PCD table additionally includes a first region extending inwardly from the upper surface and the at least one lateral surface. The first region includes at least one interstitial constituent disposed in at least a portion of the interstitial regions. The at least one interstitial constituent may be present in at least a residual amount. The at least one interstitial constituent includes at least one metal carbonate and/or at least one metal oxide. The preformed PCD table also includes a second bonding region adjacent to the substrate and extending inwardly from the back surface. The second bonding region exhibits an interstitial region concentration that is greater than that of the first region. The method further includes infiltrating at least a portion of the interstitial regions of the second bonding region of the PCD table with a metallic infiltrant effective to bond the PCD table to the substrate Other embodiments include applications utilizing the disclosed PDCs in various articles and apparatuses, such as rotary drill bits, bearing apparatuses, wire-drawing dies, machining equipment, and other articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the invention relate to PDCs including a PCD table sintered using at least one carbonate catalyst material having a bonding region with a relatively high interstitial region concentration that enables effective infiltration therein with a metallic infiltrant for bonding to a substrate, and methods of fabricating such PDCs. The PDCs disclosed herein may be used in a variety of applications, such as rotary drill bits, bearing apparatuses, wire-drawing dies, machining equipment, and other articles and apparatuses.

Figure 1A:
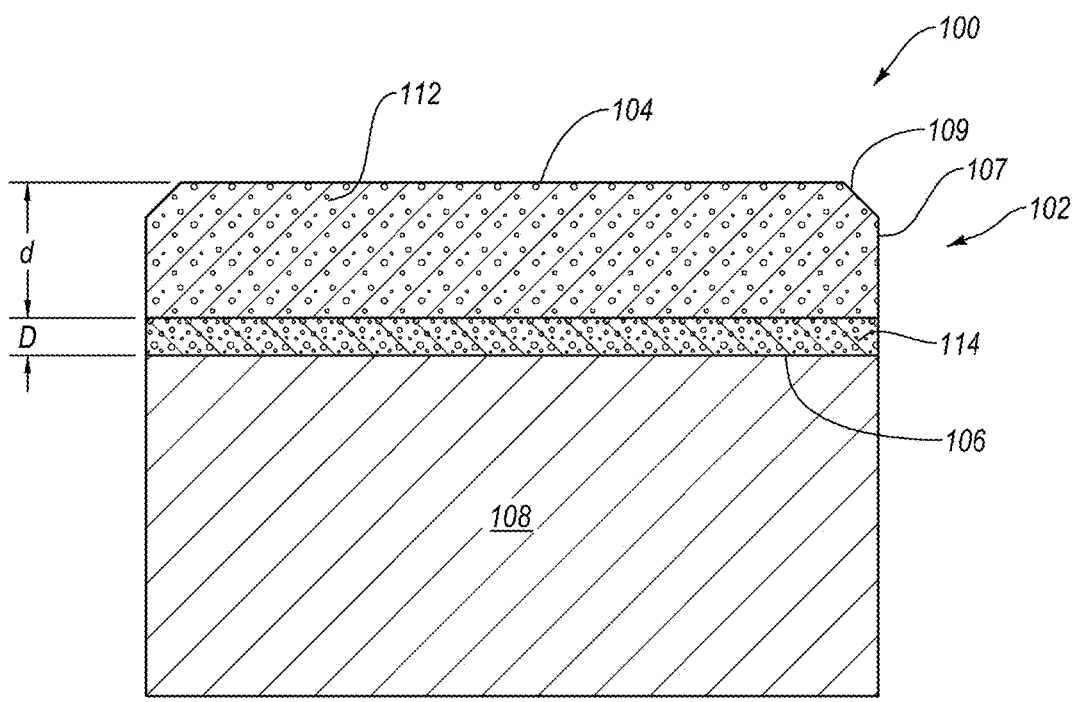
FIG. 1A is a cross-sectional view of an embodiment of a PDC.
Figure 1B:
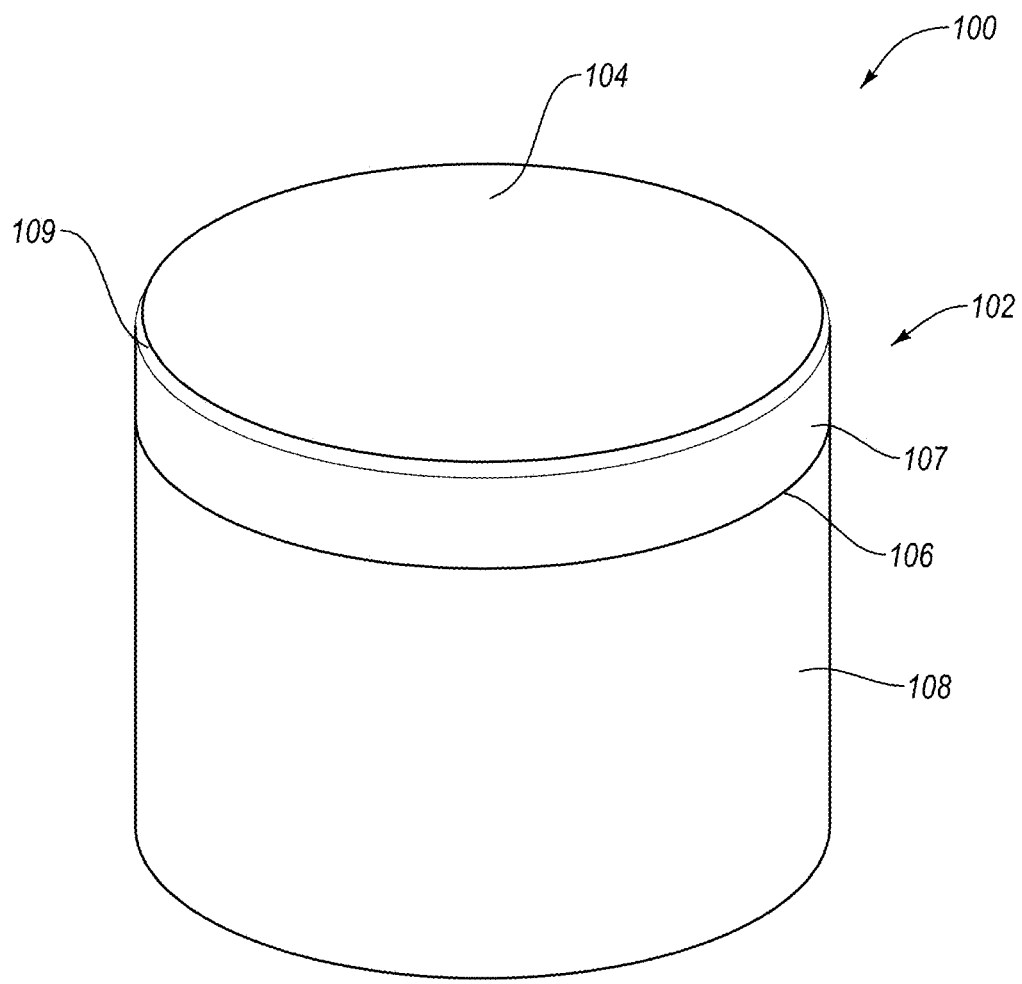
FIG. 1B is an isometric view of the PDC shown in FIG. 1A.

FIGS. 1A and 1B are cross-sectional and isometric views, respectively, of an embodiment of a PDC 100 including a preformed carbonate-catalyzed PCD table 102 that was sintered using at least one carbonate catalyst material. The PCD table 102 includes a working upper surface 104, a generally opposing interfacial back surface 106, and at least one lateral surface 107 extending therebetween. It is noted that at least a portion of the at least one lateral surface 107 may also function as a working surface that contacts a subterranean formation during drilling. In the illustrated embodiment, the preformed PCD table 102 also includes an optional chamfer 109. The chamfer 109 extends between the upper surface 104 and the at least one lateral surface 107.

The back surface 106 of the PCD table 102 is bonded to a substrate 108. The substrate 108 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. In an embodiment, the substrate 108 comprises cobalt-cemented tungsten carbide. Although the back surface 106 of the PCD table 102 is depicted in FIG. 1A as being substantially planar, in other embodiments, the back surface 106 may exhibit a selected nonplanar topography and the substrate 108 may exhibit a correspondingly configured interfacial surface or other selected interfacial surface.

The PCD table 102 includes a plurality of directly bonded-together diamond grains having diamond-to-diamond bonding (e.g., sp$^3$ bonding) therebetween. The plurality of bonded diamond grains defines a plurality of interstitial regions. As shown in FIG. 1A, the PCD table 102 includes a first region 112 having a first interstitial region concentration of interstitial regions and a second bonding region 114 adjacent to the substrate 108 and having a second interstitial region concentration of interstitial regions that is greater than that of the first interstitial region concentration. For example, each of the first and second interstitial region concentration may be characterized by a volume of interstitial regions as a percentage of a selected volume or cross-sectional area of interstitial regions as a percentage of a selected cross-sectional area. The first and second interstitial region concentrations may be measured by volumetric, area fraction, x-ray tomography, or other methods. U.S. patent application Ser. No. 12/942,524 filed on Nov. 9, 2010 discloses one suitable computed tomography system for determining interstitial region concentration and is incorporated herein, in its entirety, by this reference. For example, the second interstitial region concentration may be about 1.2 to about 1.5 times the first interstitial region concentration, at least 2 or more times the first interstitial region concentration, about 2 to about 4 times the first interstitial region concentration, about 3 to about 5 times the first interstitial region concentration. The first region 112 and the bonding region 114 may include at least one interstitial constituent disposed in at least a portion of the interstitial regions thereof. The at least one interstitial constituent includes at least one metal carbonate and/or at least one metal oxide (e.g., formed by conversion of the at least one metal carbonate after formation of the PCD table 102 and/or as a sintering by-product formed during HPHT sintering of diamond particles to form the diamond-to-diamond bonding between the diamond grains of the PCD table 102).

The at least one interstitial constituent, including the at least one metal carbonate and/or at least one metal oxide, may be present at and/or near the upper surface 104 of the first region 112 in an amount greater than 0 (zero) weight % to about 5 weight %, about 2 weight % to about 4 weight %, about 1 weight % to about 2 weight %, about 1 weight % to about 3 weight %, about 2 weight % to about 3 weight %, or about 1.5 weight % to about 2.5 weight %. The at least one interstitial constituent, including the at least one metal carbonate and/or at least one metal oxide, may be present at and/or near the back surface 106 of the bonding region 114 in an amount greater than zero weight % to about 1.5 weight %, about 0.5 weight % to about 1.5 weight %, about 0.3 weight % to about 0.7 weight %, about 0.5 weight % to about 0.8 weight %, about 0.6 weight % to about 1 weight %, or about 0.5 weight % to about 0.8 weight %. The amount of the at least one interstitial constituent may be measured using energy dispersive spectroscopy ("EDS") or Rietveld x-ray diffraction ("XRD") analysis.

It should be noted that the composition of the first region 112 may change with increasing distance toward the bonding region 114. For example, the concentration of the at least one interstitial constituent may decrease with increasing distance toward the bonding region 114.

The at least one metal carbonate present in the PCD table 102 may be selected from one or more alkali metal carbonates (e.g., one or more carbonates of Li, Na, and K), one or more alkaline earth metal carbonates (e.g., one or more carbonates of Be, Mg, Ca, Sr, and Ba), and any combination of the foregoing carbonates. The at least one metal oxide present in the PCD table 102 may be selected from one or more alkali metal oxides (e.g., one or more oxides of Li, Na, and K), one or more alkaline earth metal oxides (e.g., one or more carbonates of Be, Mg, Ca, Sr, and Ba), and any combination of the foregoing oxides.

In the illustrated embodiment, the first region 112 of the PCD table 102 extends laterally along the upper surface 104 and the optional chamfer 109. The depth "d" to which the first region 112 extends inwardly from the upper surface 104 may be about 50 μm to about 1000 μm, about 200 μm to about 500 μm, about 300 μm to about 450 μm, about 500 μm to about 700 μm, about 1000 μm to about 2000 μm, about 700 μm to about 1000 μm, about 0.1 mm to about 0.5 mm, about 0.25 mm to about 0.45 mm, or about 0.3 mm to about 0.4 mm. In some embodiments, the first region 112 may extend below the chamfer 109 as illustrated, while in other embodiments, the first region 112 may not extend past the bottom of the chamfer 109.

The bonding region 114 may be disposed between the first region 112 and the substrate 108, and extends along at least the back surface 106 of the PCD table 102. The bonding region 114 extends inwardly from the back surface 106 to a selected depth "D," which may be less than the depth "d," as shown in FIG. 1A. At least a portion of the relatively highly concentrated interstitial regions of the bonding region 114 may include a metallic infiltrant disposed therein that is infiltrated and provided from the substrate 108 or another source such as a braze alloy. For example, the metallic infiltrant may comprise iron, nickel, cobalt, or alloys thereof. As a further example, when the substrate 108 is a cobalt-cemented tungsten carbide substrate, the metallic infiltrant may comprise cobalt that infiltrates into the bonding region 114 of the PCD table 102 during bonding of the PCD table 102 to the substrate 108 in an HPHT process.

In some embodiments, the infiltration may extend throughout the bonding region 114 and at least some of the first region 112 depending upon the extent to which the metallic infiltrant infiltrates. However, more of the metallic infiltrant occupies the bonding region 114 due to the increased interstitial region concentration compared to the first region 112.

Figure 1C:
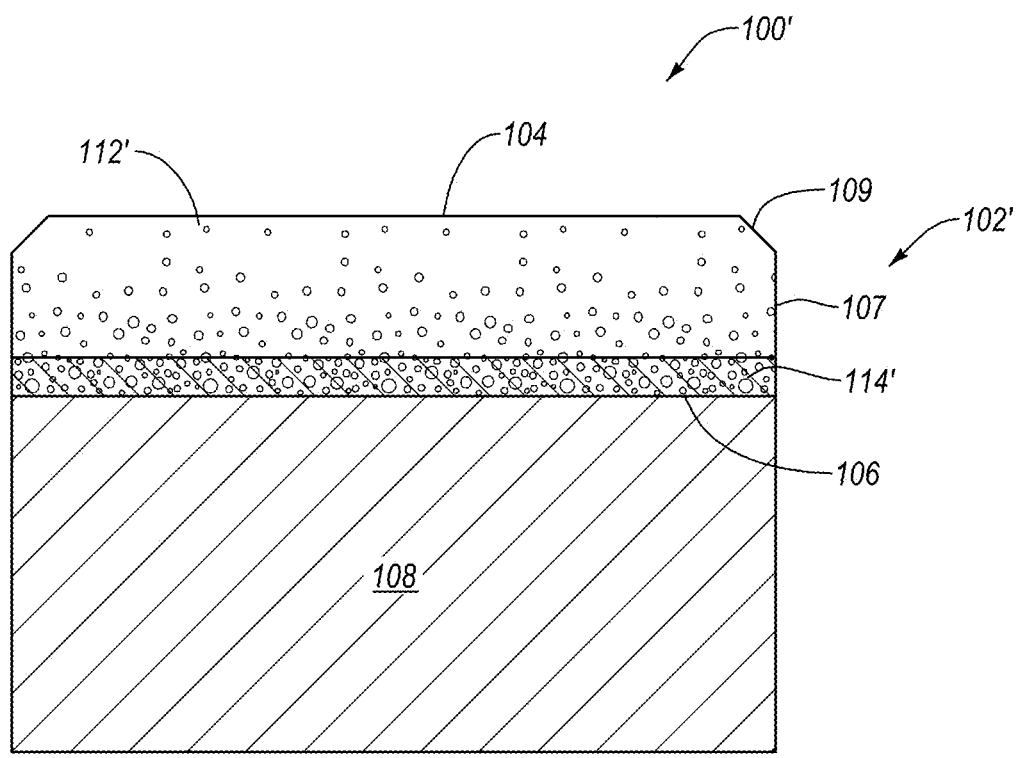
FIG. 1C is a cross-sectional view of another embodiment of a PDC including a PCD table that has been depleted of at least one interstitial constituent.

FIG. 1C is a cross-sectional view of another embodiment of a PDC 100' including a PCD table 102' that has been depleted of the at least one interstitial constituent substantially therethrough. As shown in FIG. 1C, the PCD table 102' includes a bonding region 114' including a metallic infiltrant disposed therein that is infiltrated from the substrate 108 or other source and a first region 112' that has been depleted of the at least one interstitial constituent prior to attachment to the substrate 108. The PCD table 102 may be formed by leaching a preformed carbonate-catalyzed PCD table. For example, the regions 112' and 114' of PCD table 102' may include a residual amount of the at least one interstitial constituent and/or one or more leaching by-products disposed in at least a portion of the interstitial regions thereof due to the regions being formed by leaching and at least partially removing the at least one interstitial constituent therefrom. For example, the at least one interstitial constituent may be present in the regions 112' and 114' of the PCD table 102' in a residual amount of about 0.05 weight % to about 1.50 weight %, about 0.8 weight % to about 1.50 weight %, or about 0.9 weight % to about 1.2 weight % of the PCD table 102. The one or more leaching by-products may include one or more chlorides of Be, Mg, Ca, Sr, Ba, Li, Na, and K; one or more fluorides of Be, Mg, Ca, Sr, Ba, Li, Na, and K; or any combination of the foregoing salts.

Similar to the bonding region 114 of PDC 100, the bonding region 114' of PDC 100' extends inwardly from the back surface 106 to a selected depth "D". For example, the depth "D" to which the bonding region 114' extends inwardly from the back surface 106 may be about 50 μm to about 1000 μm, about 200 μm to about 500 μm, about 300 μm to about 450 μm, about 500 μm to about 700 μm, or about 700 μm to about 1000 μm.

Figure 1D:
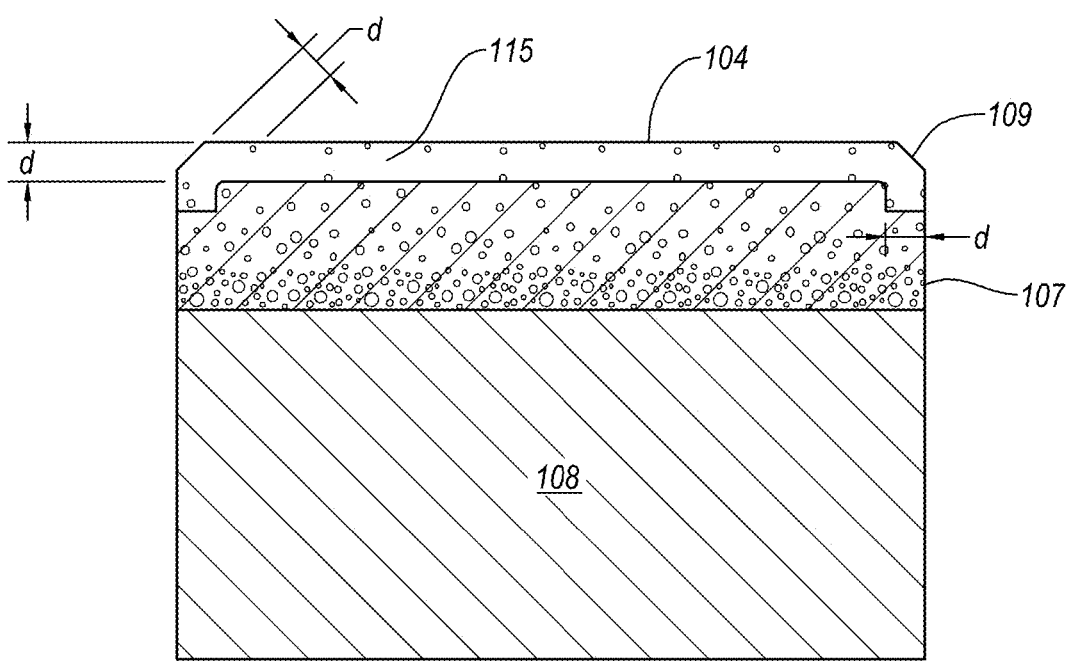
FIG. 1D is a cross-sectional view of another embodiment of a PDC having a PCD table leached to a selected depth.

Depending on the extent of infiltration, the bonding region 114' may extend to or proximate to the upper surface 104 of the first region 112' in FIG. 1C. Referring to FIG. 1D, in yet a further embodiment when the metallic infiltrant deeply infiltrates into the preformed PCD table, following infiltration, the metallic infiltrant may be acid leached to a selected depth "d" measured from at least one of the upper surface 104, the chamfer 109, or the at least one lateral surface 107 to form a leached region 115 that is depleted of the metallic infiltrant. For example, the depth "d" to which the first region 112' extends may be about 50 μm to about 1000 μm, about 200 μm to about 500 μm, about 300 μm to about 450 μm, about 500 μm to about 700 μm, about 1000 μm to about 2000 μm, or about 700 μm to about 1000 μm. For example, the leached region 115 may generally contour one or more of the upper surface 104, the chamfer 109, or the at least one lateral surface 107. The leached region 115 may extend along a selected length of the at least one lateral surface 107. A residual amount of the metallic infiltrant may be present in the leached region 115 even after leaching. For example, the metallic infiltrant may comprise about 0.8 weight % to about 1.50 weight %, or about 0.9 weight % to about 1.2 weight % of the PCD table.

Figure 2:
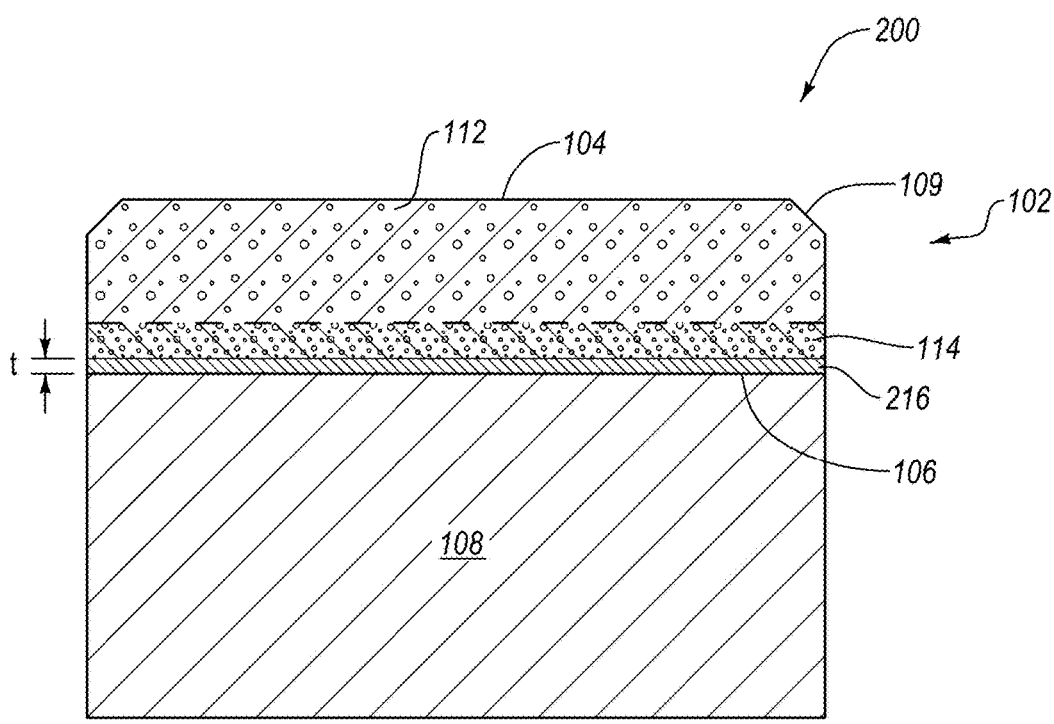
FIG. 2 is a cross-sectional view of another embodiment of a PDC including a preformed PCD table brazed to a substrate.

FIG. 2 is a cross-sectional view of an embodiment of a PDC 200 in which a preformed carbonate-catalyzed PCD table 102 (as shown in FIG. 1A) is brazed to the substrate 108. At least a portion of the interstitial regions of the bonding region 114 may include braze alloy disposed therein that has been infiltrated and provided from the braze alloy layer 216. In some embodiments, a thickness "t" of the braze alloy layer 216 may be tailored to at least improve (e.g., maximize) joint strength between the substrate 108 and the PCD table 102. For example, the thickness "t" may be about 0.0010 inch to about 0.050 inch, such as about 0.0050 inch to about 0.050 inch or about 0.010 inch to about 0.020 inch. Depending upon the extent of infiltration of the braze alloy, the braze alloy layer 216 may not be present because substantially all of the material thereof may have infiltrated into the PCD table 102 and is present substantially only in the bonding region 114. In some embodiments, the braze alloy may negligibly infiltrate into the bonding region 114.

Suitable braze alloys for the braze alloy layer 216 include gold, silver, copper, or titanium alloys. For example, suitable braze alloys for the braze alloy layer 216 may include gold-tantalum alloys or silver-copper-titanium alloys. In an embodiment, the braze alloy for the braze alloy layer 216 may be an active braze alloy. For example, one suitable active braze alloy for the braze alloy layer 216 is an alloy of about 4.5 weight % titanium, about 26.7 weight % copper, and about 68.8 weight % silver, otherwise known as TICU-SIL®, which is currently commercially available from Wesgo Metals, Hayward, Calif. Yet another suitable titanium active braze alloy for the braze alloy layer 216 is Copper ABA™ braze alloy, which has a composition of about 92.75 weight % copper, about 3.0 weight % silicon, about 2.25 weight % titanium, and 2.0 weight % aluminum. In a further embodiment, a braze alloy for the braze alloy layer 216 may comprise an alloy of about 25 weight % gold, about 37 weight % copper, about 10 weight % nickel, about 15 weight % palladium, and about 13 weight % manganese, otherwise known as PALNICUROM® 10, which is also currently commercially available from Wesgo Metals, Hayward, Calif. Another suitable braze alloy may include about 92.3 weight % nickel, about 3.2 weight % boron, and about 4.5 weight % silicon. Yet another suitable braze alloy may include about 92.8 weight % nickel, about 1.6 weight % boron, and about 5.6 weight % silicon.

Although the PDCs 100, 100', and 200 shown in FIGS. 1A-2 are illustrated as being cylindrical, the PDCs disclosed herein may exhibit other selected configurations. For example, the PDCs may exhibit a rectangular, triangular, elliptical, or other selected configuration.

Figure 3A:
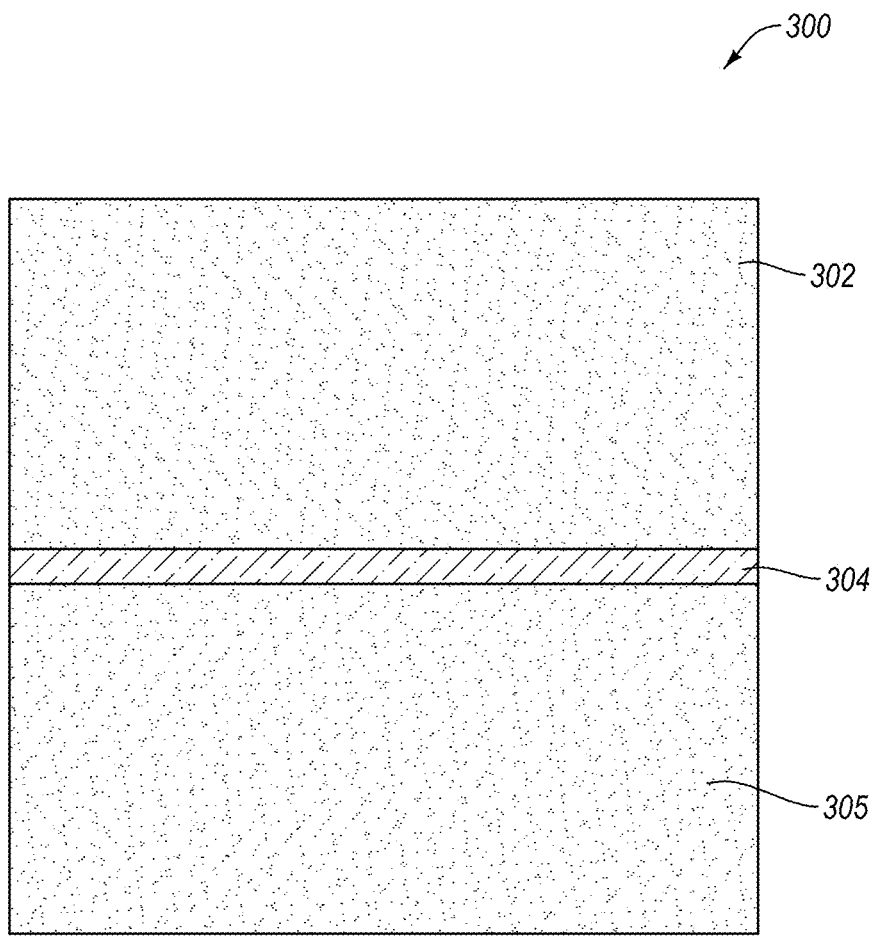
FIGS. 3A-3F are cross-sectional views at different stages during a method of manufacturing the PDC shown in FIG. 1A according to an embodiment.
Figure 3B:
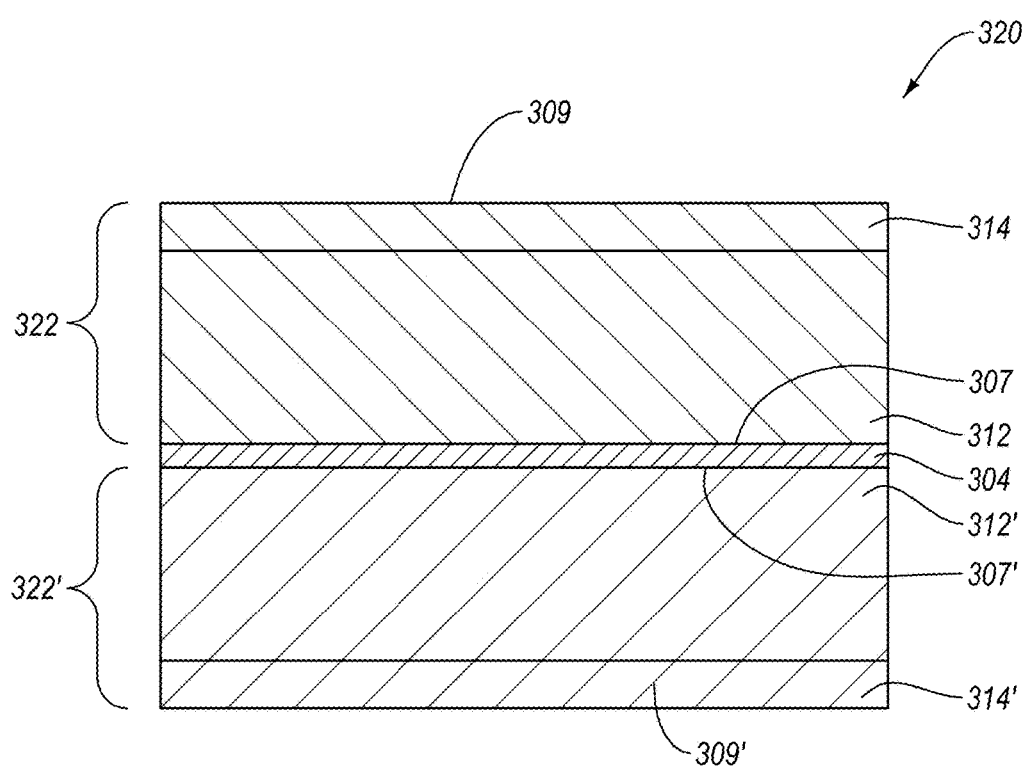

FIGS. 3A-3F are cross-sectional views at different stages during a method of manufacturing the PDC 100 shown in FIG. 1A according to an embodiment. FIG. 3A is a cross-sectional view of an embodiment of a PCD precursor assembly 300 for forming two carbonate catalyzed PCD tables. At least one carbonate catalyst material 304 (e.g., a powder or disk) is disposed between first and second regions 302 and 305 each including a plurality of diamond particles, thereby forming the PCD precursor assembly 300. The PCD precursor assembly 300 may be subjected to an HPHT process to partially or completely melt the carbonate catalyst material 304 and sinter the plurality of diamond particle regions 302 and 305 to form a second PCD precursor assembly 320 as shown in FIG. 3B. As will be apparent from the description further below, placement of the carbonate catalyst material 304 between the plurality of diamond particle regions 302 and 305 not only catalyzes the growth of additional diamond between the diamond particles during HPHT processing, but also provides for the formation of regions 312 and 312' of PCD tables 322 and 322' so formed (see FIGS. 3B and 3C) exhibiting increased diamond-to-diamond bonding between the diamond grains. The presence of the carbonate catalyst material 304 between the plurality of diamond particle regions 302 and 305 during HPHT processing also provides for the formation of bonding regions 314 and 314' in the PCD tables 322 and 322' (see FIGS. 3B and 3C) exhibiting an increased interstitial porosity concentration as compared to the regions 312 and 312'. The bonding regions 314 and 314' shown FIGS. 3B and 3C having a relatively greater interstitial porosity facilitate infiltration of metallic infiltrant into the interstitial regions between the diamond grains of a carbonate-catalyzed PCD table during bonding of the PCD table to a substrate.

The plurality of diamond particles of the first and second regions 302 and 305 (shown in FIG. 3A) may be chosen from natural diamond, synthetic diamond, or combinations thereof. The plurality of diamond particles 302 and 305 (shown in FIG. 3A) may also exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 μm and 20 μm). More particularly, in various embodiments, the plurality of diamond particles may include a portion exhibiting a relatively larger size (e.g., 100 μm, 90 μm, 80 μm, 70 μm, 60 μm, 50 μm, 40 μm, 30 μm, 20 μm, 15 μm, 12 μm, 10 μm, 8 μm) and another portion exhibiting at least one relatively smaller size (e.g., 30 μm, 20 μm, 10 μm, 15 μm, 12 μm, 10 μm, 8 μm, 4 μm, 2 μm, 1 μm, 0.5 μm, less than 0.5 μm, 0.1 μm, less than 0.1 μm). In an embodiment, the plurality of diamond particles may include a portion exhibiting a relatively larger size between about 40 μm and about 15 μm and another portion exhibiting a relatively smaller size between about 12 μm and 2 μm. Of course, the plurality of diamond particles may also include three or more different sizes (e.g., one relatively larger size and two or more relatively smaller sizes) without limitation.

In some embodiments, each of the plurality of diamond particles 302 and 305 may include two or more layers exhibiting different compositions and/or different average diamond particle sizes. For example, a first layer may be located adjacent to the at least one carbonate catalyst material 304 and exhibit a first diamond particle size, while a second layer may be located remote from the at least one carbonate catalyst material 304 and exhibit a second average diamond particle size that is less than that of the first average diamond particle size. For example, the second average diamond particle size may be about 90% to about 98% (e.g., about 90 to about 95%) of the first diamond particle size. In another embodiment, the second average diamond particle size may be greater than that of the first average diamond particle size. For example, the first average diamond particle size may be about 90% to about 98% (e.g., about 90 to about 95%) of the second diamond particle size.

As an alternative to or in addition to the first and second layers exhibiting different diamond particles sizes, in an embodiment, the composition of the first layer may be different than that of the second layer. The first layer may include about 15 weight % or less of a tungsten-containing material (e.g., tungsten and/or tungsten carbide) mixed with the diamond particles, while the second layer may be substantially free of tungsten. For example, the tungsten-containing material may be present in the first layer in an amount of about 1 weight % to about 10 weight %, about 5 weight % to about 10 weight %, or about 10 weight %.

The carbonate catalyst material 304 (shown in FIG. 3A) may include one or more alkali metal carbonates (e.g., one or more carbonates of Li, Na, and K), one or more alkaline earth metal carbonates (e.g., one or more carbonates of Be, Mg, Ca, Sr, and Ba), or any combination of the foregoing carbonates. For example, the at least one carbonate catalyst material 304 may be formed by pressing fine powder of the at least one carbonate catalyst material. Such fine powder may be commercially available from Causmag International. According to an embodiment, the at least one carbonate catalyst material 304 may include a first alkaline earth metal carbonate and at least a second alkaline earth metal carbonate present in selected proportions at or near a eutectic composition for the chemical system defined by the first and at least a second alkaline earth metal carbonates. In an embodiment, the first alkaline earth metal carbonate may be selected from a Group II carbonate (e.g., a carbonate of Be, Mg, Ca, Sr, Ba, or Ra) and the at least a second alkaline earth metal carbonate may be selected from one or more Group II carbonates that are different than that of the first alkaline earth metal carbonate. For example, the first alkaline earth metal carbonate and the at least a second alkaline earth metal carbonate may form a binary or greater chemical system that exhibits a eutectic point, and the first alkaline earth metal carbonate and the at least a second alkaline earth metal carbonate may form a eutectic, hypereutectic, or hypoeutectic composition.

According to an embodiment, the at least one carbonate catalyst material may comprise magnesium carbonate and a second carbonate catalyst material such as calcium carbonate. In an embodiment, the magnesium carbonate and calcium carbonate may be present in selected proportions at or near a binary eutectic composition (e.g., a eutectic composition, a hypereutectic composition, or a hypoeutectic composition) for the magnesium carbonate-calcium carbonate chemical system.

In order to efficiently sinter the plurality of diamond particles 302 and 305 to form the PCD tables 322 and 322', the PCD precursor assembly 300 may be enclosed in a pressure transmitting medium, such as a refractory metal can, graphite structure, pyrophyllite, combinations thereof, or other suitable pressure transmitting structure to form a cell assembly. In some embodiments, the mixture may be sealed in a can assembly. Examples of suitable gasket materials and cell structures for use in manufacturing PCD are disclosed in U.S. Pat. No. 6,338,754 and U.S. patent application Ser. No. 11/545,929, each of which is incorporated herein, in its entirety, by this reference. Another example of a suitable pressure transmitting material is pyrophyllite, which is commercially available from Wonderstone Ltd. of South Africa. The PCD precursor assembly 300, including the plurality of diamond particles 302 and 305 and the carbonate catalyst material 304, is subjected to an HPHT process using an ultra-high pressure press (e.g., a cubic press) at a temperature of at least about 1400° C. and a pressure in the pressure transmitting medium of at least about 7.5 GPa for a time sufficient to sinter the diamond particles together and form the PCD tables 322 and 322' comprising directly bonded-together diamond grains. Further details about HPHT processing techniques that may be used to practice the embodiments disclosed herein are disclosed in U.S. Pat. No. 7,866,418, which is incorporated herein, in its entirety, by reference. For example, the temperature may be about 1700° C. to about 2700° C., about 2000° C. to about 2400° C., about 2200° C. to about 2400° C. or about 2300° C. to about 2450° C. and the pressure may be about 7.5 GPa to about 15 GPa, about 9 GPa to about 12 GPa, about 8 GPa to about 10 GPa, or about 10 GPa to about 12.5 GPa.

The pressure values employed in the HPHT processes disclosed herein refer to the pressure in the pressure transmitting medium at room temperature (e.g., about 25° C., or slightly above due to compressive (friction) heating) with application of pressure using an ultra-high pressure press and not the pressure applied to the exterior of the cell assembly. The actual pressure in the pressure transmitting medium at sintering temperature may be higher. The ultra-high pressure press may be calibrated at room temperature by embedding at least one calibration material that changes structure at a known pressure, such as PbTe, thallium, barium, or bismuth in the pressure transmitting medium. Further, optionally, a change in resistance may be measured across the at least one calibration material due to a phase change thereof. For example, PbTe exhibits a phase change at room temperature at about 6.0 GPa and bismuth exhibits a phase change at room temperature at about 7.7 GPa. Examples of suitable pressure calibration techniques are disclosed in G. Rousse, S. Klotz, A. M. Saitta, J. Rodriguez-Carvajal, M. I. McMahon, B. Couzinet, and M. Mezouar, "Structure of the Intermediate Phase of PbTe at High Pressure," Physical Review B: Condensed Matter and Materials Physics, 71, 224116 (2005) and D. L. Decker, W. A. Bassett, L. Merrill, H. T. Hall, and J. D. Barnett, "High-Pressure Calibration: A Critical Review," J. Phys. Chem. Ref. Data, 1, 3 (1972).

Referring to both FIGS. 3A and 3B, during the HPHT process, the carbonate catalyst material 304 may at least partially or completely melt and infiltrate into the plurality of diamond particle regions 302 and 305 to facilitate diamond growth and sinter the plurality of diamond particle regions 302 and 305 to form the PCD tables 322 and 322'. It is noted that the as-sintered average diamond grain size of respective PCD tables 322 and 322' formed after HPHT processing shown in FIG. 3B may substantially the same as or different from the average particle size of the plurality of diamond particles prior to sintering due to a variety of different physical processes, such as grain growth, diamond particles fracturing, nucleation and subsequent growth of new diamond crystals, carbon provided from another carbon source, or combinations of the foregoing.

The PCD tables 322/322' exhibit respective first regions 312/312' and bonding regions 314/314' having relatively higher porosity concentration (as measured by any of the disclosed measurement techniques) than the first regions 312/312'. The PCD tables 322 and 322' so-formed include directly bonded-together diamond grains exhibiting diamond-to-diamond bonding (e.g., $sp^3$ bonding) therebetween. The plurality of bonded diamond grains defines a plurality of interstitial regions. Most of the interstitial regions near the carbonate catalyst material 304 are infiltrated with the at least one carbonate catalyst material that acts as a sintering aid. As the at least one carbonate catalyst material 304 infiltrates the diamond particles during HPHT processing, a gradient of interstitial region porosity concentration may be formed within the PCD tables 322 and 322' that increases from surfaces 307 and 307' toward surfaces 309 and 309' of the respective bonding regions 314 and 314'. The bonding region 314 has an interstitial region porosity concentration that is greater than the interstitial region porosity concentration of the region 312, and the bonding region 314' has an interstitial region porosity concentration that is greater than the interstitial region porosity concentration of the region 312'. For example, the interstitial region porosity concentration of the bonding region 314/314' may be about 1.2 to about 1.5 times the interstitial region porosity concentration of the region 312/312', at least 2 or more times the interstitial region porosity concentration of the region 312/312', about 2 to about 4 times the interstitial region porosity concentration of the region 312/312', about 3 to about 5 times the interstitial region porosity concentration of the region 312/312'.

The PCD tables 322 and 322' includes at least one interstitial constituent disposed in at least a portion of the interstitial regions between the bonded diamond grains thereof. The at least one interstitial constituent includes the at least one metal carbonate and/or at least one metal oxide converted from the at least one metal carbonate. The at least one interstitial constituent may be present at and/or near the surface 307/307' of the region 312/312' in an amount greater than 0 (zero) weight % to about 5 weight %, about 1 weight % to about 2 weight %, about 2 weight % to about 4 weight %, about 2 weight % to about 3 weight %, about 1 weight % to about 3 weight %, or about 1.5 weight % to about 2.5 weight %. The at least one interstitial constituent, including the at least one metal carbonate and/or at least one metal oxide, may be present at and/or near the surface 309/309' of the bonding region 314/314' in an amount greater than 0 (zero) weight % to about 1.5 weight %, about 0.3 weight % to about 0.7 weight %, about 0.5 weight % to about 1.5 weight %, about 0.4 weight % to about 0.8 weight %, about 0.6 weight % to about 1 weight %, or about 0.5 weight % to about 0.8 weight %. The concentration of the at least one interstitial constituent, may gradually increase with increasing distance from the bonding region 114 to the first region 112.

Figure 3C:
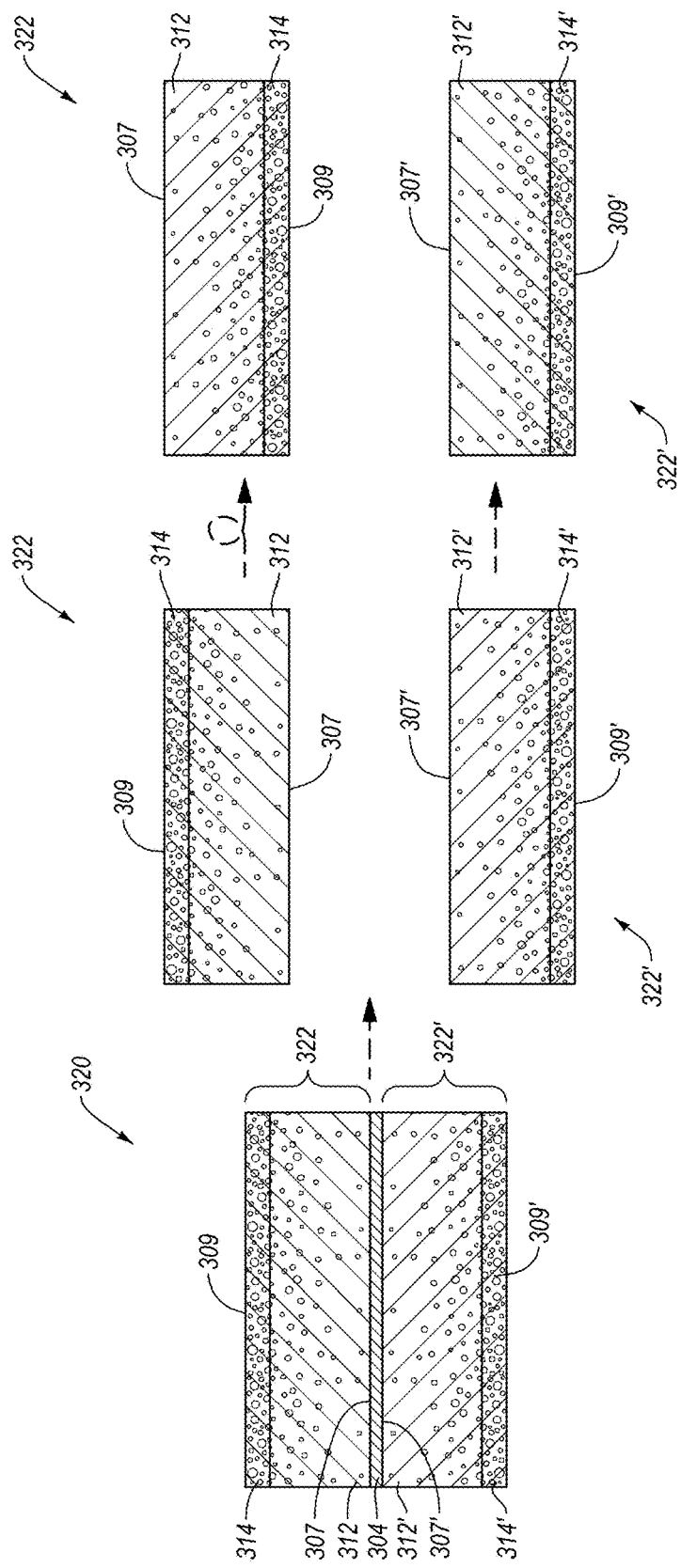

Referring to FIG. 3C, once formed, the PCD precursor assembly 320 may be separated by hand to form the respective PCD tables 322 and 322'. In other embodiments, if the PCD tables 322 and 322' are attached to each other directly, along respective surfaces 307 and 307'. In such an embodiment, the PCD tables 322 and 322' may be separated from the PCD precursor assembly 320 using laser cutting, electrical discharge machining ("EDM"), or other suitable methods. For example, U.S. patent application Ser. No. 13/166,007, which is incorporated herein in its entirety by this reference, discloses various laser cutting techniques for cutting the PCD tables 322 and 322' from the PCD table precursor 320.

During the HPHT processing, it may be possible to cause some or substantially all of the at least one metal carbonate present in the PCD tables 322 and 322' to convert to a corresponding metal oxide. On the other hand, the at least one metal carbonate may remain in the PCD tables 322 and 322'. For example, in an embodiment, when magnesium carbonate is employed as a metal carbonate catalyst, some or substantially all of the magnesium carbonate may convert to magnesium oxide during the HPHT process. However, in any of the embodiments disclosed herein, the PCD tables 322 and 322' may be heat treated to convert some or substantially all of the at least one metal carbonate present in the PCD tables 322 and 322' to a corresponding at least one metal oxide prior to the process in which the PCD tables 322 and 322' are bonded to a substrate.

In some embodiments, heat treating the PCD tables 322 and 322' prior to bonding to a substrate may provide for more effective infiltration of the porous bonding regions 314 and 314' during bonding. Such heat treatment may result in the removal of gaseous by-products from the conversion of metal carbonates to metal oxides, such as carbon monoxide and/or carbon dioxide. The removal of these gaseous by-products may promote bonding of the PCD tables 322 and 322' to a metallic substrate by facilitating effective infiltration of the interstitial regions between the diamond grains of the PCD tables with a metallic infiltrant without interference from the gaseous by-products. For example, the carbonate catalyzed PCD tables 322 and 322' may be heat treated a temperature of about 700° C. to about 1400° C. (e.g., about 1000° C. to about 1300° C., or about 1100° C. to about 1200° C.) for a time (e.g., more than an 1 hour, about 0.5 hour to about 1.5 hour, about 0.8 hour to about 1 hour, or about 2 hours to about 5 hours) sufficient to convert at least some or at least most of the at least one metal carbonate to a corresponding at least one metal oxide, thereby releasing gaseous by-products generated during the heat treating process.

Referring back to FIG. 3C, once separated from the PCD assembly 320, in some embodiments, the carbonate catalyzed PCD tables 322 and 322' may be subjected to a material removal process to remove at least a portion of the at least one interstitial constituent therefrom to form a treated carbonate-catalyzed PCD table 340 (see FIG. 3D) including a gradient of porosity, with interstitial porosity concentration increasing from the region 312, toward the bonding region 314. In some embodiments, the material removal process may be performed after heat treating the PCD tables 322 and 322'. In other embodiments, the material removal process may be performed before heat treating the PCD tables 322 and 322'.

In an embodiment, the material removal may be a leaching process. For example, the carbonate-catalyzed PCD table 322 may be immersed in an acid (e.g., hydrochloric acid, nitric acid, hydrofluoric acid, acetic acid, or mixtures thereof) for a time sufficient to remove the at least one interstitial constituent. As an alternative to or in addition to the foregoing acids, boiling water may also be used for leaching. For example, the leaching may be performed for a time ranging from a few hours to a few days. In some embodiments, the leaching process may be more effective when performed after heating treating in which the metal carbonate (e.g., magnesium carbonate) is converted to a metal oxide (e.g., magnesium oxide). The amount of material removed from the two regions 312 and 314 may vary due to the differences in interstitial region concentration within each of the regions.

Figure 3D:
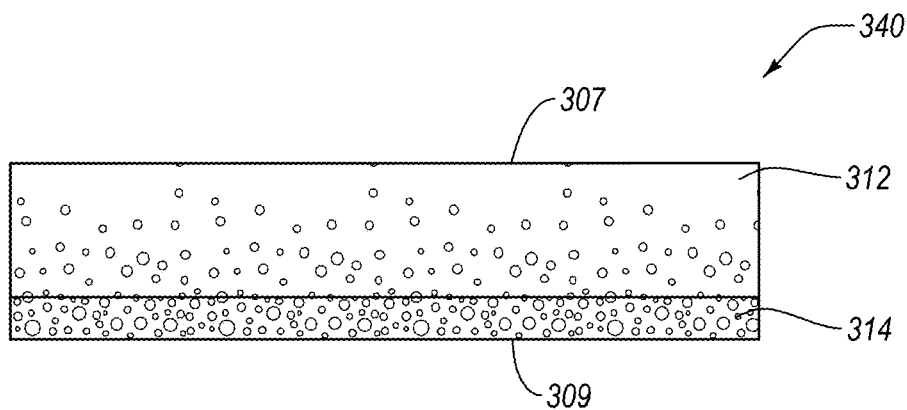

In some embodiments, the treated PCD table 340 shown in FIG. 3D may be substantially free of the at least one interstitial constituent. Residual amounts of one or more leaching by-products generated during the removal of the at least one interstitial constituent during the leaching process may still remain in at least some of the interstitial regions of the treated PCD table 340. For example, the one or more leaching by-products may include salts, such as one or more chlorides of Be, Mg, Ca, Sr, Ba, Li, Na, and K; one or more fluorides of Be, Mg, Ca, Sr, Ba, Li, Na, and K; or any combination of the foregoing salts. The specific type of the one or more salts that may be present in the PCD table 340 depends upon the composition of the at least one carbonate catalyst material and the acid used to leach the treated PCD table 340. However, the presence of the residual one or more leaching by-products is not sufficient to significantly inhibit infiltration of the treated PCD table 340. In some embodiments, the treated PCD table 340 may be cleaned to at least partially remove the leaching by-products from the treated PCD table 340. For example, U.S. Pat. No. 7,845,438, which is incorporated herein in its entirety by this reference, discloses various cleaning techniques for at least partially removing leaching by-products from the treated PCD table 340.

In some embodiments, the heat treating and material removal processes may be repeated, as desired or needed. For example, the PCD table may be subjected to any of the material removal processes disclosed herein, followed by heat treating according to any of the material removal process, followed by another one of the disclosed material removal processes. In another embodiment, the PCD table may be heat treated according to any of the material removal process, followed by subjecting the heat treated PCD table to any of the material removal processes disclosed herein, followed by followed by another one of the disclosed heat treating processes.

Prior to or after the material removal process and/or heat treating (if applicable), the PCD table 322 may be shaped, such as by machining and/or grinding, to selectively tailor the geometry of the PCD table 322. For example, a chamfer (not shown) may be machined that extends between two major surfaces of the PCD table 322.

Figure 3E:
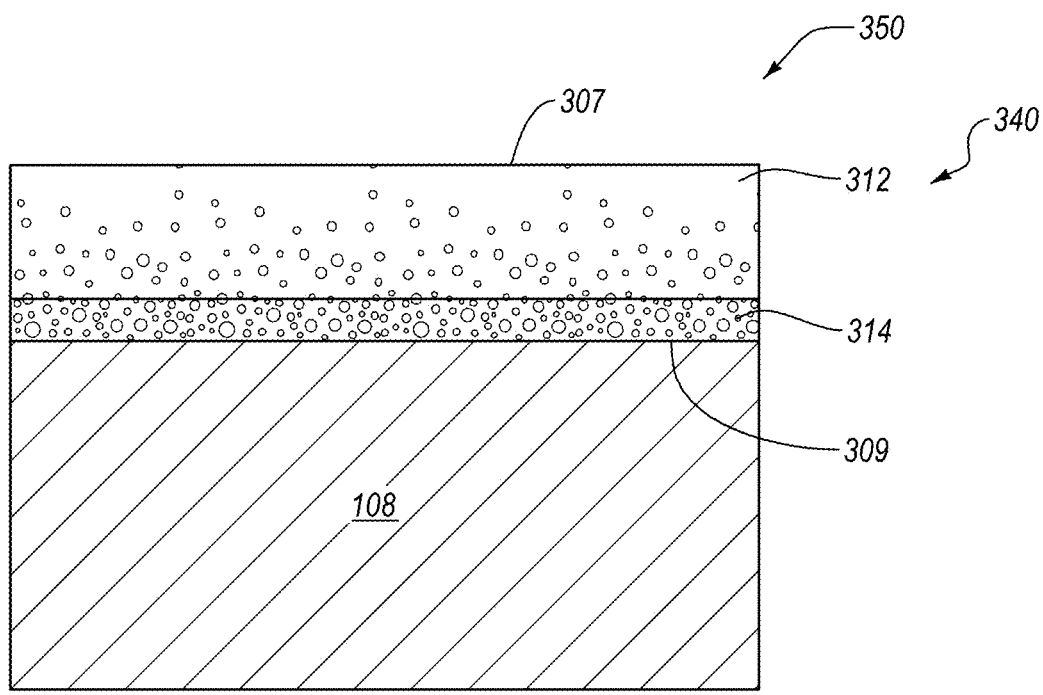
Figure 3F:
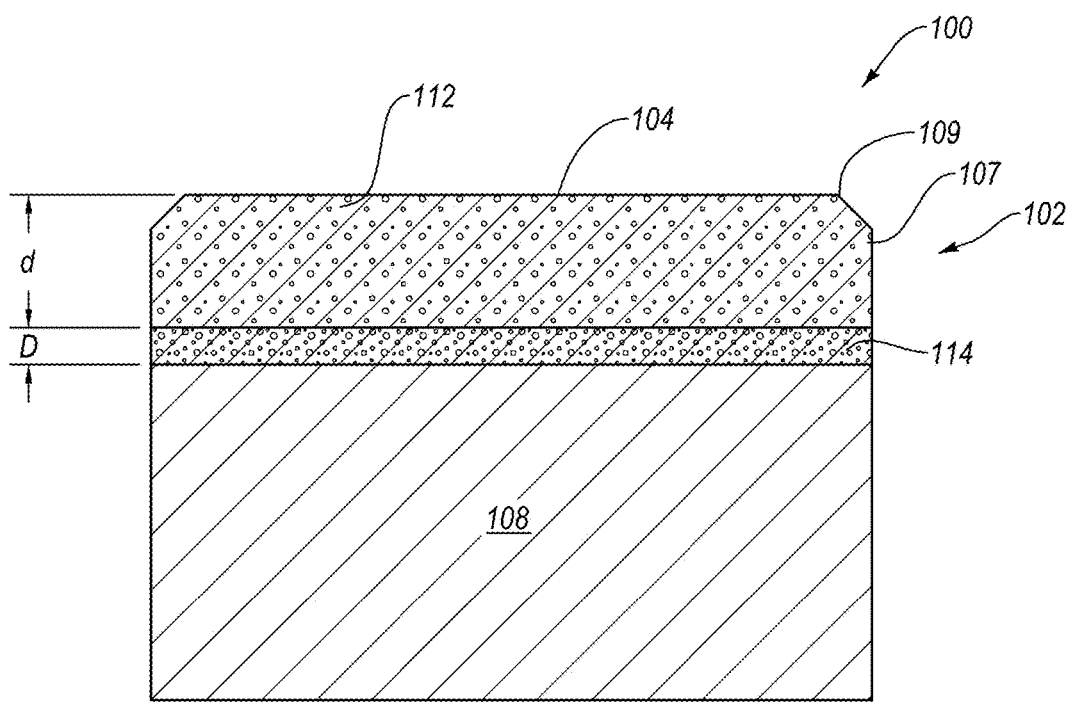

Referring to FIG. 3E, the treated carbonate-catalyzed PCD table 340 may be placed adjacent to the substrate 108 to form an assembly 350. The assembly 350 may be subjected to an HPHT process using any of the HPHT conditions and pressure transmitting mediums disclosed herein. In some embodiments, the HPHT conditions may include a pressure that is lower than the pressure employed in sintering the PCD table, such as at about 4-7 GPa and a temperature of about 850 to about 1600° C. or any HPHT disclosed herein. In some embodiments, the assembly 350 may be sealed in a can assembly as disclosed in U.S. application Ser. No. 11/545,929, previously incorporated by reference. During the HPHT process, a metallic cementing constituent from the substrate 108 liquefies and infiltrates as a metallic infiltrant into at least a portion of the interstitial regions of the bonding region 314 adjacent to the surface 309 of the treated carbonate-catalyzed PCD table 340. For example, when the substrate 108 is a cobalt-cemented tungsten carbide substrate, the metallic infiltrant may be cobalt provided from a cobalt-cemented tungsten carbide substrate. Upon cooling from the HPHT process, the metallic infiltrant provides a strong metallurgical bond between the infiltrated carbonate-catalyzed PCD table 340 and the substrate 108, forming the PDC 100 as shown in FIGS. 1A and 3F. Depending upon the extent of the infiltration of the metallic infiltrant, the metallic infiltrant may infiltrate into a portion of the first region 112 adjacent to the at least one lateral surface 107.

In other embodiments, the PCD table 322 or 322' may be placed adjacent to the substrate 108 to form an assembly. The assembly may be subjected to an HPHT process using any of the HPHT conditions and pressure transmitting mediums disclosed herein. In such an embodiment, the PCD table 322 or 322' may be heat treated and/or subjected to a material removal process according to any of the techniques disclosed herein prior to and/or after bonding to the substrate 108, if desired. As previously described, during the HPHT process, a metallic cementing constituent from the substrate 108 liquefies and infiltrates as a metallic infiltrant into at least a portion of the high concentration of interstitial regions of the bonding region 314 adjacent to the back surface 306 of the PCD table 322 or 322'. In yet another embodiment, the PCD table 322/322' or 340 may be brazed to the substrate in a vacuum furnace using any of the braze alloys disclosed herein prior to and/or after being subjected to any of the heat treatments and/or material removal processes disclosed herein.

The following Working Examples 1-8 of the invention set forth various embodiments for fabricating magnesium-carbonate-catalyzed PCD tables and bonding magnesium-carbonate-catalyzed PCD tables to cobalt-cemented tungsten carbide substrates. The following working examples provide further detail in connection with the specific embodiments described above.

Working Example 1

A magnesium-carbonate-catalyzed PCD table was initially fabricated by disposing a magnesium carbonate catalyst material between two regions, each of which included a plurality of synthetic diamond particles having an average diamond particle size of about 20 µm to form an assembly. The assembly was subjected to an HPHT process at a temperature of about 2200° C. and a cell pressure of about 7.7 GPa in a cubic press to form a carbonate-catalyzed PCD precursor assembly similar to that shown in FIGS. 3A-3C. Two magnesium-carbonate-catalyzed PCD tables were subsequently separated from the carbonate-catalyzed PCD precursor assembly. Each of the magnesium-carbonate-catalyzed PCD tables exhibited a gradient of interstitial porosity concentration exhibiting increased porosity in a bonding region thereof, as shown in FIG. 3C.

The magnesium-carbonate-catalyzed PCD table was subjected to a leaching process by immersing the carbonate-catalyzed PCD table in a 50% vol/vol solution of acetic acid at approximately 118° C. for 2 hours to partially remove the magnesium-based interstitial constituent (e.g., MgO and/or $MgCO_3$) within the interstitial regions between the bonded diamond grains of the magnesium-carbonate-catalyzed PCD table. The magnesium-carbonate-catalyzed PCD table was then immersed in boiling deionized water for 2 hours. Following the treating the magnesium-carbonate-catalyzed PCD table in the boiling deionized water, the magnesium-carbonate-catalyzed PCD table was heat treated at about 1200° C. for about 1 hour in a vacuum furnace to at least partially convert magnesium carbonate in the magnesium-carbonate-catalyzed PCD table to magnesium oxide, while releasing gaseous by-products such as, for example, carbon dioxide and/or carbon monoxide.

After heat treating, the magnesium-carbonate-catalyzed PCD table was brazed to a cobalt-cemented tungsten carbide substrate using two foils of Copper ABA™ braze alloy. The Copper ABA™ braze alloy had a composition of about 92.75 weight % copper, about 3.0 weight % silicon, about 2.25 weight % titanium, and 2.0 weight % aluminum. Each foil had a thickness of about 0.0020 inch. The two foils were placed between the cobalt-cemented tungsten carbide substrate and the high porosity region of the magnesium-carbonate-catalyzed PCD table. The magnesium-carbonate-catalyzed PCD table was brazed to the cobalt-cemented tungsten carbide substrate under partial vacuum conditions.

Working Example 2

A magnesium-carbonate-catalyzed PCD table was fabricated as described in Working Example 1 and heat treated at about 1200° C. for a period of about one hour in a vacuum furnace to at least partially convert magnesium carbonate formed within interstitial regions of the magnesium-carbonate-catalyzed PCD table to magnesium oxide. Following the heat treatment, the magnesium-carbonate-catalyzed PCD table was boiled in a 50% vol/vol of acetic acid solution at about 118° C. for 2 hours to at least partially remove the magnesium-based interstitial constituent (e.g., MgO and/or $MgCO_3$) within the interstitial regions between the bonded diamond grains of the magnesium-carbonate-catalyzed PCD table. The magnesium-carbonate-catalyzed PCD table was subsequently immersed in boiling deionized water for 2 hours.

After being immersed in boiling deionized water, the magnesium-carbonate-catalyzed PCD table was brazed to a cobalt-cemented tungsten carbide substrate using two foils of Copper ABA™ braze alloy. The two foils were placed between the cobalt-cemented tungsten carbide substrate and the high porosity region of the magnesium-carbonate-catalyzed PCD table. Each foil had a thickness of about 0.0020 inch. The brazing process was carried out under the same conditions as performed in Working Example 1.

Working Example 3

A magnesium-carbonate-catalyzed PCD table was fabricated as described in Working Example 1 and subjected to a leaching process in a solution of hydrofluoric acid and nitric acid for 8 hours to at least partially remove the magnesium-based interstitial constituent (e.g., MgO and/or $MgCO_3$) within the interstitial regions between the bonded diamond grains of the carbonate-catalyzed PCD table. After leaching, the magnesium-carbonate-catalyzed PCD table was brazed to a cobalt-cemented tungsten carbide substrate using two foils of Copper ABA™ braze alloy. The two foils were placed between the cobalt-cemented tungsten carbide substrate and the high porosity region of the magnesium-carbonate-catalyzed PCD table (i.e., bonding region 314 in FIG. 3C). Each foil had a thickness of about 0.0020 inch. The brazing process was carried out under the same conditions as performed in Working Example 1.

Figure 4A:
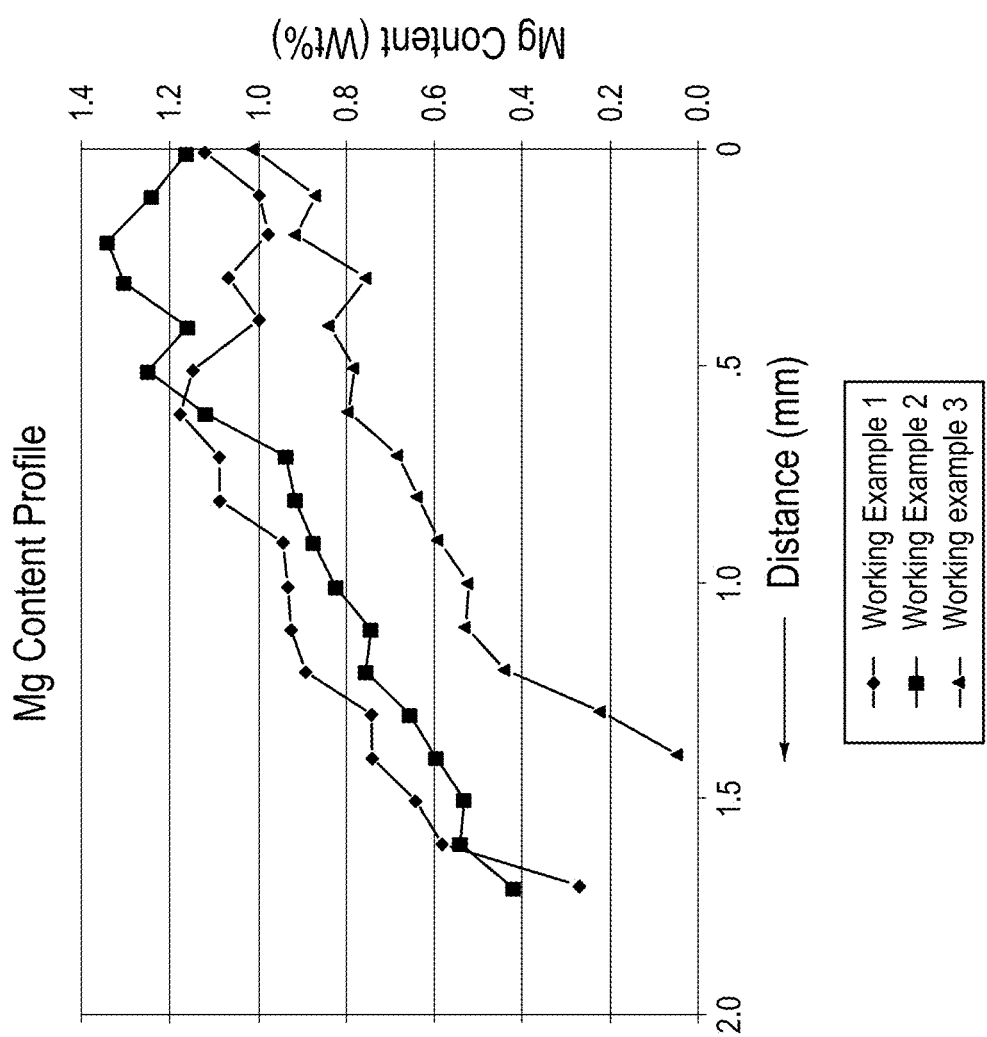
FIG. 4A is a graph of magnesium content profile measured in the magnesium-carbonate-catalyzed PCD tables of Working Examples 1-3.

FIG. 4A shows a graph of data for magnesium content in one of the magnesium-carbonate-catalyzed PCD tables from each of Working Examples 1-3 prior to being bonded to the cobalt-cemented tungsten carbide substrate. The magnesium content was measured using EDS in a SEM. As shown in FIG. 4A, magnesium content increases within the magnesium-carbonate-catalyzed PCD table with increasing distance from the bonding regions 314 (left side of graph) to the first regions 312 (right side of graph) (see FIG. 3C).

Working Example 4

A magnesium-carbonate-catalyzed PCD table was fabricated as described in Working Example 1 and heat treated at about 1150° C. in a vacuum furnace to at least partially decompose the $MgCO_3$ to magnesium oxide. After heat treating, the magnesium-carbonate-catalyzed PCD table was brazed to a cobalt-cemented tungsten carbide substrate using two foils of Copper ABA™ under diamond-stable conditions in a cubic press at a temperature of about 1050° C. The two foils were placed between the cobalt-cemented tungsten carbide substrate and the high porosity region of the magnesium-carbonate-catalyzed PCD table. Each foil had a thickness of about 0.0020 inch.

Figure 4B:
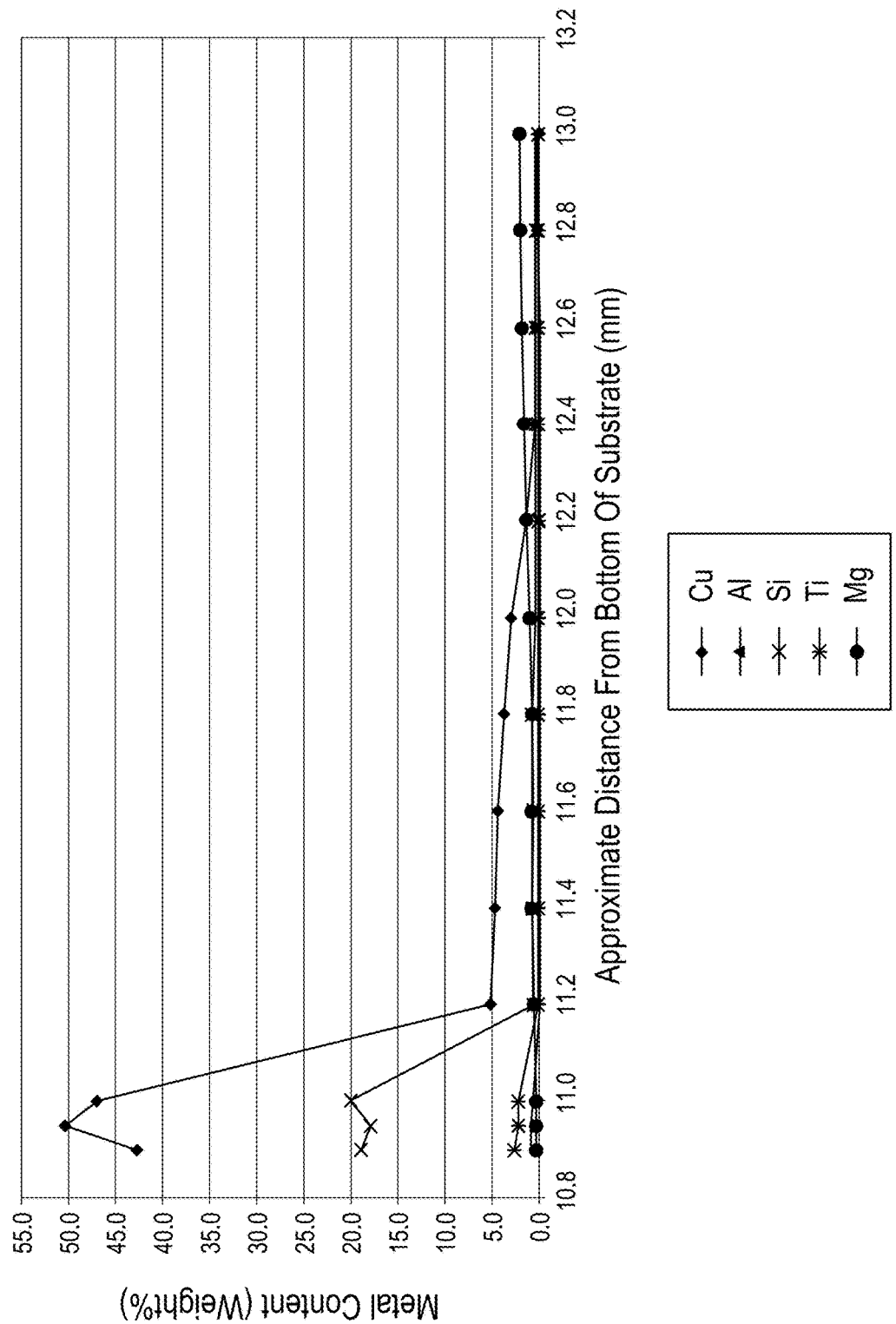
FIG. 4B is a graph of metal content profile measured in the magnesium-carbonate-catalyzed PCD tables of Working Example 4.

FIG. 4B is a graph of data showing the metal content within the final magnesium-carbonate-catalyzed PCD table of Working Example 4 following the brazing process relative to distance from the bottom surface of the cobalt-cemented tungsten carbide substrate. As shown in FIG. 4B that the metal content from both the magnesium catalyst and the braze alloy in the magnesium-carbonate-catalyzed PCD table decreased with distance from the cobalt-cemented tungsten carbide substrate as is consistent with the decreasing gradient in interstitial porosity concentration of the magnesium-carbonate-catalyzed PCD table from the bonding region to the working surface.

Working Example 5

A magnesium-carbonate-catalyzed PCD table was fabricated as described in Working Example 1 and heat treated at about 1200° C. for about 30 minutes in a vacuum furnace to at least partially convert magnesium carbonate in interstitial regions of the magnesium-carbonate-catalyzed PCD table to magnesium oxide, thereby releasing gaseous by-products (e.g., carbon monoxide and/or carbon dioxide). Following heat treatment, the magnesium-carbonate-catalyzed PCD table was assembled with a cobalt-cemented tungsten carbide substrate to form an assembly, with the higher porosity region of the magnesium-carbonate-catalyzed PCD table placed adjacent to the cobalt-cemented tungsten carbide substrate. The assembly was subjected to an HPHT process at a temperature of about 1400° C. and a cell pressure of about 5.5 GPa using a cubic press in order to bond the magnesium-carbonate-catalyzed PCD table placed adjacent to the cobalt-cemented tungsten carbide substrate. During the HPHT process, cobalt from the cobalt-cemented tungsten carbide substrate melted and infiltrated into the magnesium-carbonate-catalyzed PCD table so that the magnesium-carbonate-catalyzed PCD table was effectively bonded to the cobalt-cemented tungsten carbide substrate.

Working Example 6

A magnesium-carbonate-catalyzed PCD table was fabricated as described in Working Example 1 and heat treated at about 1200° C. for about 30 minutes in a vacuum furnace to at least partially convert magnesium carbonate in interstitial regions of the magnesium-carbonate-catalyzed PCD table to magnesium oxide, thereby releasing gaseous by-products (e.g., carbon monoxide and/or carbon dioxide). As previously discussed, the release of such gases may facilitate the infiltration of cobalt into the interstitial regions between the diamond grains in the magnesium-carbonate-catalyzed PCD table. Following the heat treatment, the magnesium-carbonate-catalyzed PCD table was immersed in hydrochloric acid maintained at about 75° C. for about 72 hours to at least partially remove the interstitial constituent (e.g., magnesium oxide and/or magnesium carbonate) within the interstitial regions between the diamond grains of the magnesium-carbonate-catalyzed PCD table. The magnesium-carbonate-catalyzed PCD table was subsequently subjected to a second heat treatment at about 1200° C. for about 30 minutes. After the second heat treatment, the magnesium-carbonate-catalyzed PCD table was attached to a cobalt-cemented tungsten carbide substrate as performed in Working Example 5.

Following the HPHT bonding of the magnesium-carbonate-catalyzed PCD tables, the metal content profile in the magnesium-carbonate-catalyzed PCD tables of the PDCs of Working Examples 5 and 6 were analyzed using EDS in a SEM. The results of the analysis of these magnesium-carbonate-catalyzed PCD tables are shown in FIG. 5.

Figure 5:
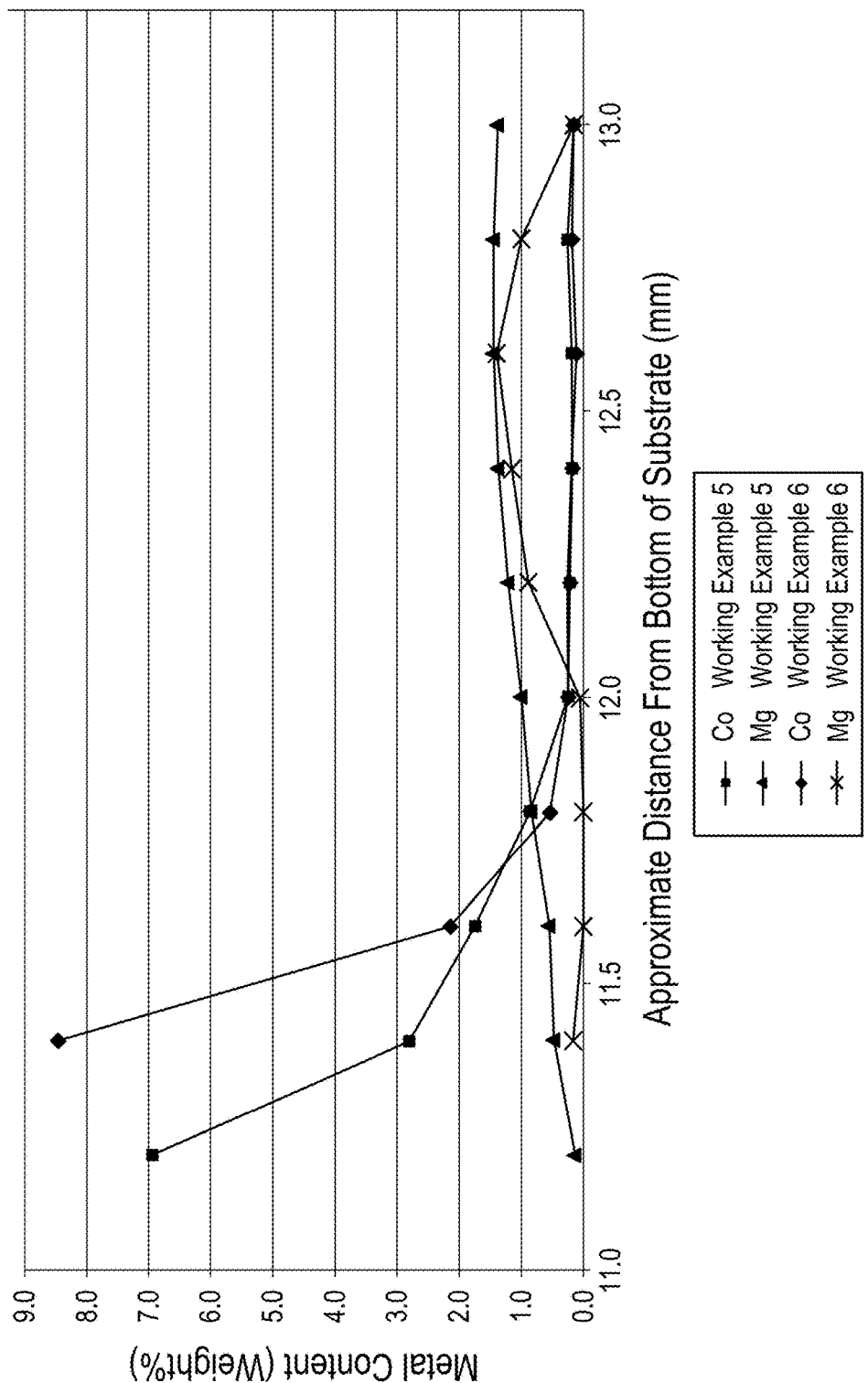
FIG. 5 is a graph of profile of magnesium and cobalt content measured in the magnesium-carbonate-catalyzed PCD tables of Working Examples 5 and 6.

FIG. 5 is a scatter plot of data illustrating the magnesium and cobalt content measured in the magnesium-carbonate-catalyzed PCD tables of PDCs of Working Examples 5 and 6. The plot shown in FIG. 5, illustrates a higher concentration of cobalt in the bonding region closest to the cobalt-cemented tungsten carbide substrate, with a substantially reduced amount of cobalt in the region (near the working surface) of the magnesium-carbonate-catalyzed PCD table farthest from the cobalt-cemented tungsten carbide substrate. Magnesium generally increases and cobalt generally decreases with distance from the cobalt-cemented tungsten carbide substrate. This observation is consistent with the higher interstitial porosity concentration of the bonding region adjacent to the cobalt-cemented tungsten carbide substrate that facilitated a relatively higher amount of cobalt infiltration during the HPHT bonding process compared to the lower interstitial porosity concentration of the region near the working surface. FIG. 5 also illustrates the increase in the amount of magnesium in the region of the magnesium-carbonate-catalyzed PCD table (near the working surface) compared to the bonding region closer to the cobalt-cemented tungsten carbide substrate.

Working Example 7

A magnesium-carbonate-catalyzed PCD table was fabricated as described in Working Example 1. The magnesium-carbonate-catalyzed PCD table was structured similarly to the PCD table 322 having a bonding region 314 and a region 312 shown in FIG. 3. The magnesium-carbonate-catalyzed PCD table was analyzed by Rietveld XRD analysis to determine the composition of the bonding region 314 and the first region. Unlike Working Examples 4-6, the magnesium-carbonate-catalyzed PCD table analyzed was free-standing (i.e., not bonded to a substrate). The Rietveld analysis demonstrated that the concentration of magnesium carbonate at and/or near a surface 309/309' of the bonding region 314/314' was about 0.7 weight % and the concentration of magnesium carbonate at and/or near a surface 307/307' of the region 312 was about 2.1 weight %.

Working Example 8

Synthetic diamond powder having an average particle size of about 20 μm from Engis Corporation U.S.A and natural magnesium carbonate powder having an average particle size of about 7 μm from Causmag International Australia were used as starting materials. The diamond powders were layered beneath and above the magnesium carbonate as shown in FIG. 3A. Layered diamond and magnesium carbonate powders were encapsulated inside tantalum foil to prevent contamination from molten salt of the cell assembly during HPHT sintering.

The diamond powders layered beneath and above the magnesium carbonate enclosed in the tantalum foil were HPHT sintered at around 8 GPa cell pressure and 2200-2400° C. for 5 minutes in a cubic press. Internal pressure was calibrated with fixed pressure points from bismuth (I-II 2.5 GPa, II-III 2.7 GPa, III-V 7.7 GPa), tellurium (I-II 4.0 GPa), and lead telluride (6.0 GPa). Temperature was either directly measured with W5% Re-W26% Re thermocouples or estimated from electric heating power-temperature curves. The pressure effect on thermocouple e.m.f. was not corrected. The magnesium-carbonate-catalyzed PCD samples were first finished as magnesium-carbonate-catalyzed PCD tables having a diameter of 11 mm and a thickness of 2 mm.

Figure 6A:
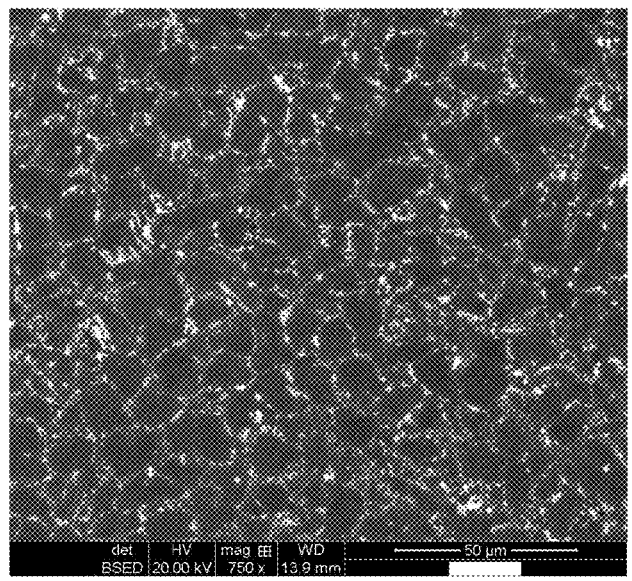
FIG. 6A is a backscattered electron scanning electron microscope ("SEM") image of one of the magnesium-carbonate-catalyzed PCD tables of Working Example 8 at 750 times magnification.

XRD indicated that the $MgCO_3$ was preserved even after HPHT sintering. As shown in the backscattered electron SEM image in FIG. 6A of one of the magnesium-carbonate-catalyzed PCD tables of Working Example 8, the magnesium-carbonate-catalyzed PCD table exhibited a substantially homogeneous sintered dense microstructure having intergranular diamond growth. Though the Z numbers of carbon, oxygen, and magnesium are close, darker black/gray diamond grains are differentiable from white, lighter $MgCO_3$ areas. No abnormal diamond grain growth was visible.

Each magnesium-carbonate-catalyzed PCD table was brazed to a cobalt-cemented tungsten carbide substrate in a vacuum furnace at about 800-850° C. using a TICUSIL® braze alloy foil having a composition of about 4.5 weight % titanium, about 26.7 weight % copper, and about 68.8 weight % silver to form a PDC. The magnesium-carbonate-catalyzed PCD table was assembled with the cobalt-cemented tungsten carbide substrate so that the high porosity region of the PCD disc was placed adjacent to the cobalt-cemented tungsten carbide substrate.

The wear resistance of the PDCs were measured by cutting granite with a water-based coolant on a vertical turret lathe ("VTL"). Thermal stability was measured on the same VTL test, but without coolant. Cutting parameters the wear resistance test are a depth of cut for the PDC of about 0.254 mm, a back rake angle for the PDC of about 20 degrees, an in-feed for the PDC of about 6.35 mm/rev, and a rotary speed of the workpiece to be cut of about 101 rpm. The workpiece was cooled with a coolant. Cutting parameters for the thermal stability test was a depth of cut for the PDC of about 1.27 mm, a back rake angle for the PDC of about 20 degrees, an in-feed for the PDC of about 1.524 mm/rev, a cutting speed of the workpiece to be cut of about 1.78 m/sec.

Rupture strength was measured on 1 mm thick PDC discs using a burst disc apparatus. The thin discs of the PDCs were supported along the outer diameter, and hydraulic pressure was applied to one side of the PDC disc until it ruptured. The maximum stress was calculated from the pressure at failure and reported as the rupture strength.

Figure 6B:
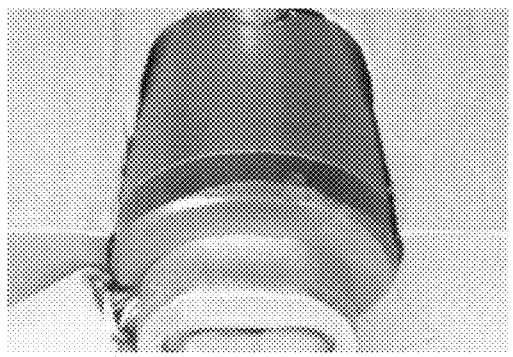
FIGS. 6B-6E are photographs of wear scars on one of the PDCs of Working Example 8 and a conventional cobalt-sintered PDC after cutting a granite workpiece.
Figure 6C:
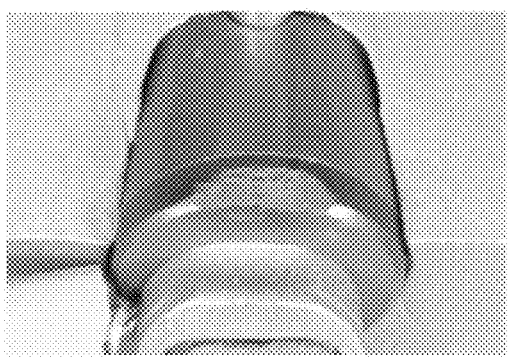
Figure 6D:
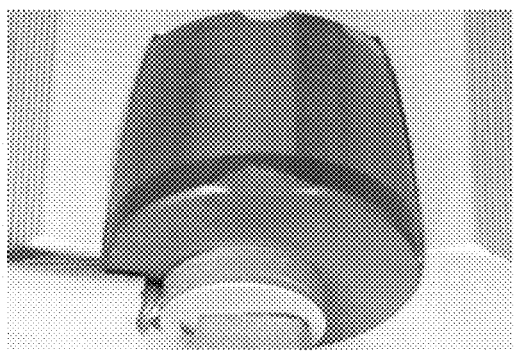
Figure 6E:
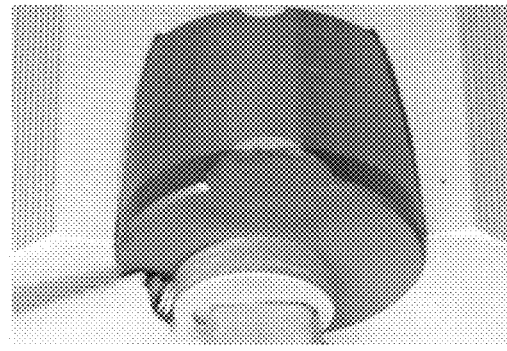

FIGS. 6B-6E contains typical photographs of wear scars on one of the PDCs of Working Example 8 and a conventional cobalt-sintered PDC after cutting 7,700 $cm^3$ and 15,400 $cm^3$ of granite. The PCD table of the cobalt-sintered PDC samples had a leach depth of about 210 μm. As shown in FIG. 6B, wear barely passes the chamfer with a small half-circle chip on the outer diameter of the PDC of Working Example 8. The wear appears narrow in width, but passes beyond the chamfer and reaches the bottom half of the PCD table for cobalt-sintered PDC after removing 7,700 $cm^3$ of rock, as shown in FIG. 6D. The difference in wear volume becomes more visible after 15,400 $cm^3$ of rock was removed. The wear surface appears rough with a chip on the top of the PCD table, but it only extends approximately ⅔ of the PCD table for the PDC of Working Example 8 in FIG. 6C. A large, smooth wear scar extends past the WC—Co substrate for cobalt-sintered PDC in FIG. 6E.

Figure 6F:
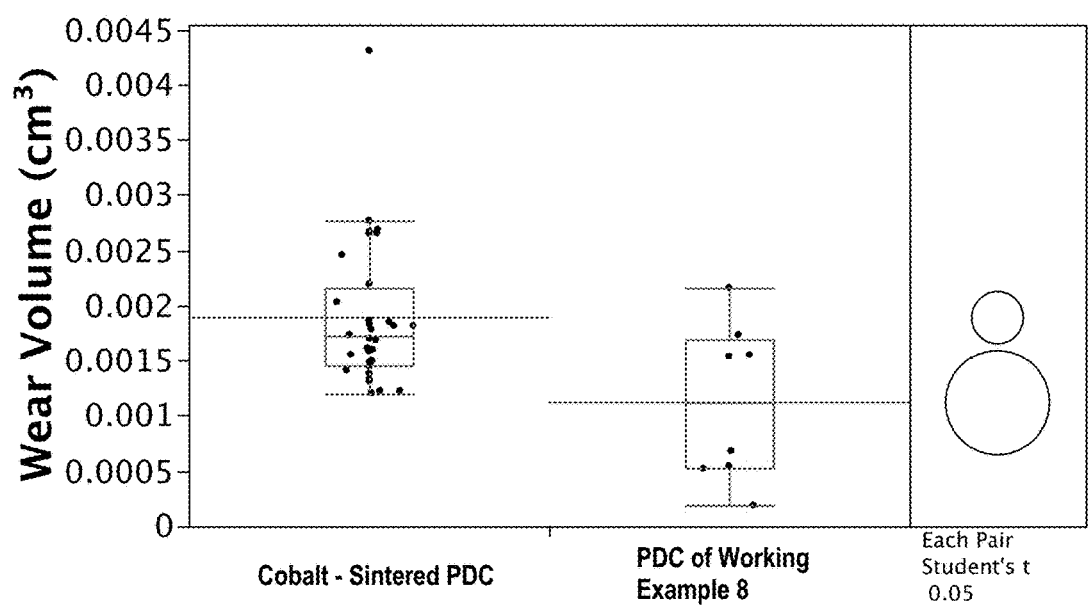
FIG. 6F is a statistical comparison of wear volumes between the PDCs of Working Example 8 and conventional cobalt-sintered PDCs after removing 15,400 cm$^3$ of rock on the wet VTL test.

FIG. 6F is a statistical comparison of wear volumes between PDCs of Working Example 8 and the cobalt-sintered PDCs after removing 15,400 $cm^3$ of rock on the wet VTL test. The mean wear volumes were 0.0011 and 0.0019 $cm^3$, respectively. A hypothesis test shows that the two means were significantly different ($p=0.02$). Overall, the PDCs of Working Example 8 have a better wear resistance than cobalt-sintered PDC due to the high thermal stability and inert chemical nature of the magnesium carbonate catalyst. However, wear scars of the PDCs of Working Example 8 may involve slightly more chipping.

Figure 6G:
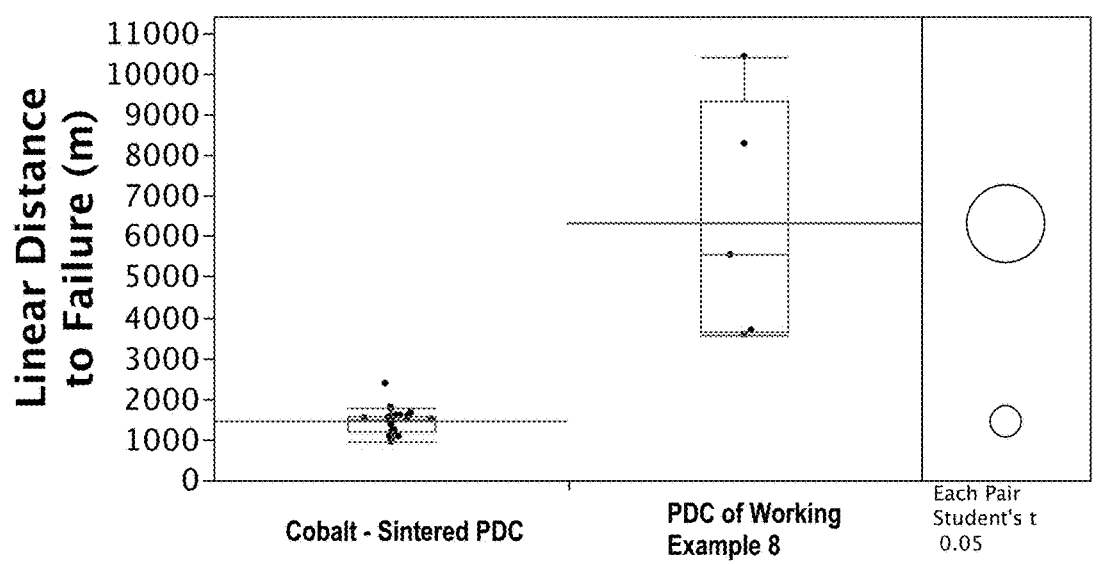
FIG. 6G is a statistical comparison of thermal stability between the PDCs of Working Example 8 and the conventional cobalt-sintered PDCs.

On the dry VTL test, the PDCs of Working Example 8 exceeds the cobalt-sintered PDC in thermal stability. In this test, the PDCs of Working Example 8 cut against granite without water-based coolant until they fail catastrophically. A sudden jump in temperature when the PDC fails can be monitored and used to determine the linear distance to failure. FIG. 6G is a statistical comparison of thermal stability between the PDCs of Working Example 8 and the cobalt-sintered PDCs. The mean distance to failure was 6300 and 1440 meters, respectively. A hypothesis tests shows the two means were significantly different ($p=0.01$), which can be seen by the clear separation of the two confidence interval circles on the student's t plot in FIG. 6G. The exceptional thermal stability of the PDCs of Working Example 8 was believed to be derived from the presence of interstitial magnesium carbonate among the bonded diamond grains.

Figure 6H:
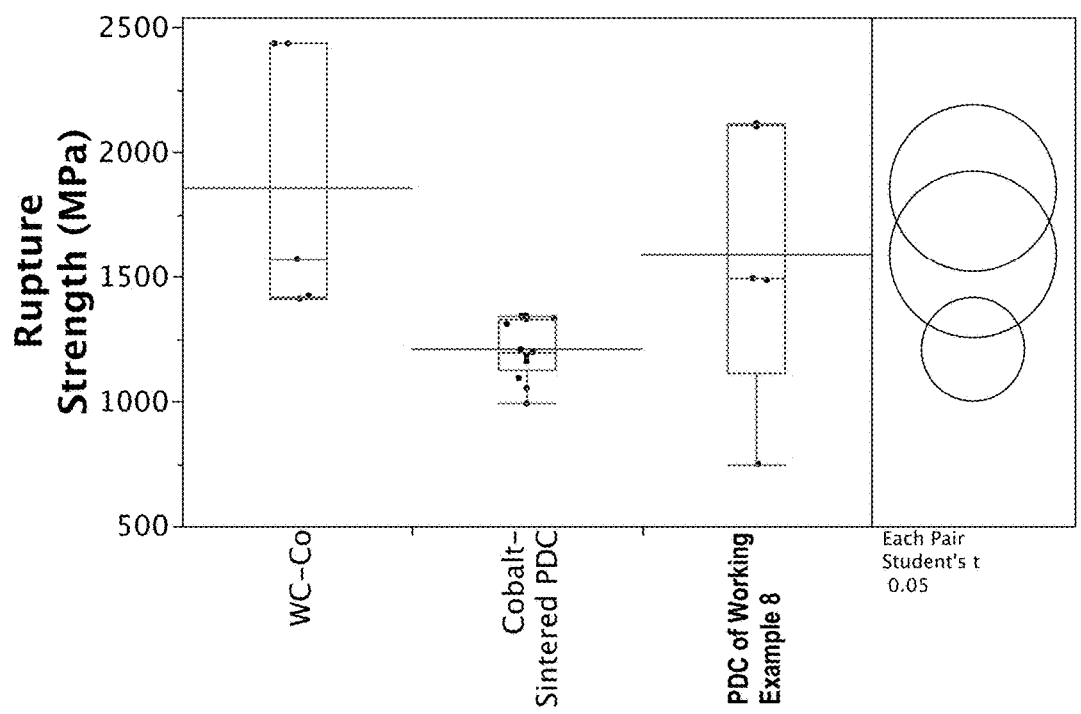
FIG. 6H is the statistical comparison of rupture strength between WC-13 weight % Co, the conventional cobalt-sintered PDC discs, and the PDCs of Working Example 8.

Rupture strength is another property of superhard materials, and it is hypothesized to decrease when the tested materials change from ductile to brittle. FIG. 6H is the statistical comparison of rupture strength between WC-13 weight % Co disc, the cobalt-sintered PDC discs, and the PDCs of Working Example 8. The mean rupture strengths were 1855, 1208, and 1589 MPa, respectively. A hypothesis test showed that the rupture strength of the PDCs of Working Example 8 was slightly weaker than WC—Co disc ($p=0.25$), but was greater than the cobalt-sintered PDC ($p=0.03$). A clear gap was observed between the two confidence interval circles representing the PDCs of Working Example 8 and the cobalt-sintered PDC in FIG. 6H. It was surprising and unexpected that the PDCs of Working Example 8 had higher rupture strengths than the cobalt-sintered PDCs because both diamond and magnesium carbonate are non-metallic brittle materials. However, considering the sintering pressure and temperature of ~8 GPa/2300° C. and the possible additional carbon from magnesium carbonate itself during HPHT sintering, the inventors currently believe that molten magnesium carbonate may dissolve more carbon atoms and facilitate more diamond precipitation, thereby growing stronger diamond bonds than in the cobalt-sintered PDCs that are sintered at approximately 6 GPa at a temperature of about 1400° C.

Figure 7A:
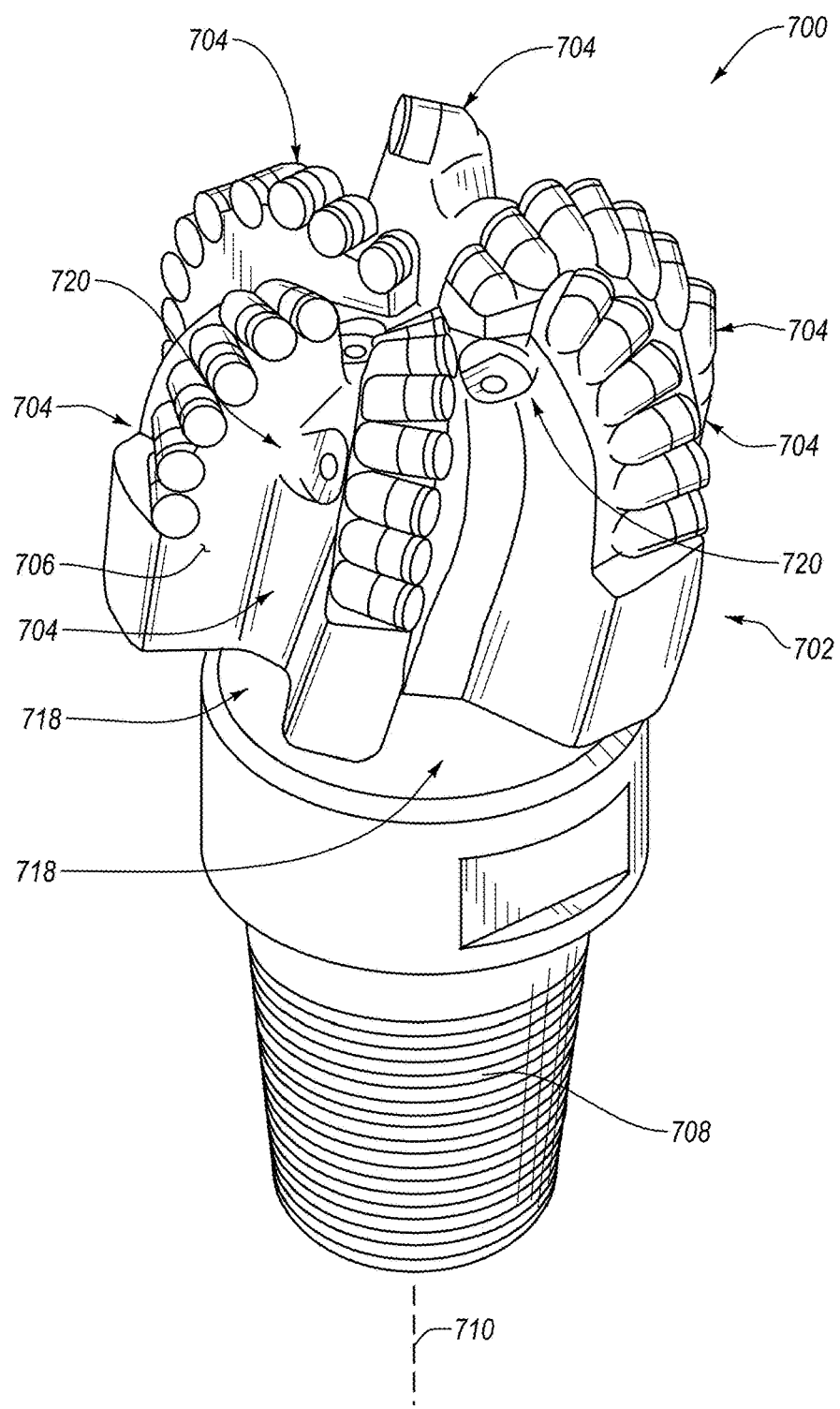
FIG. 7A is an isometric view of an embodiment of a rotary drill bit that may employ one or more of the disclosed PDC embodiments.
Figure 7B:
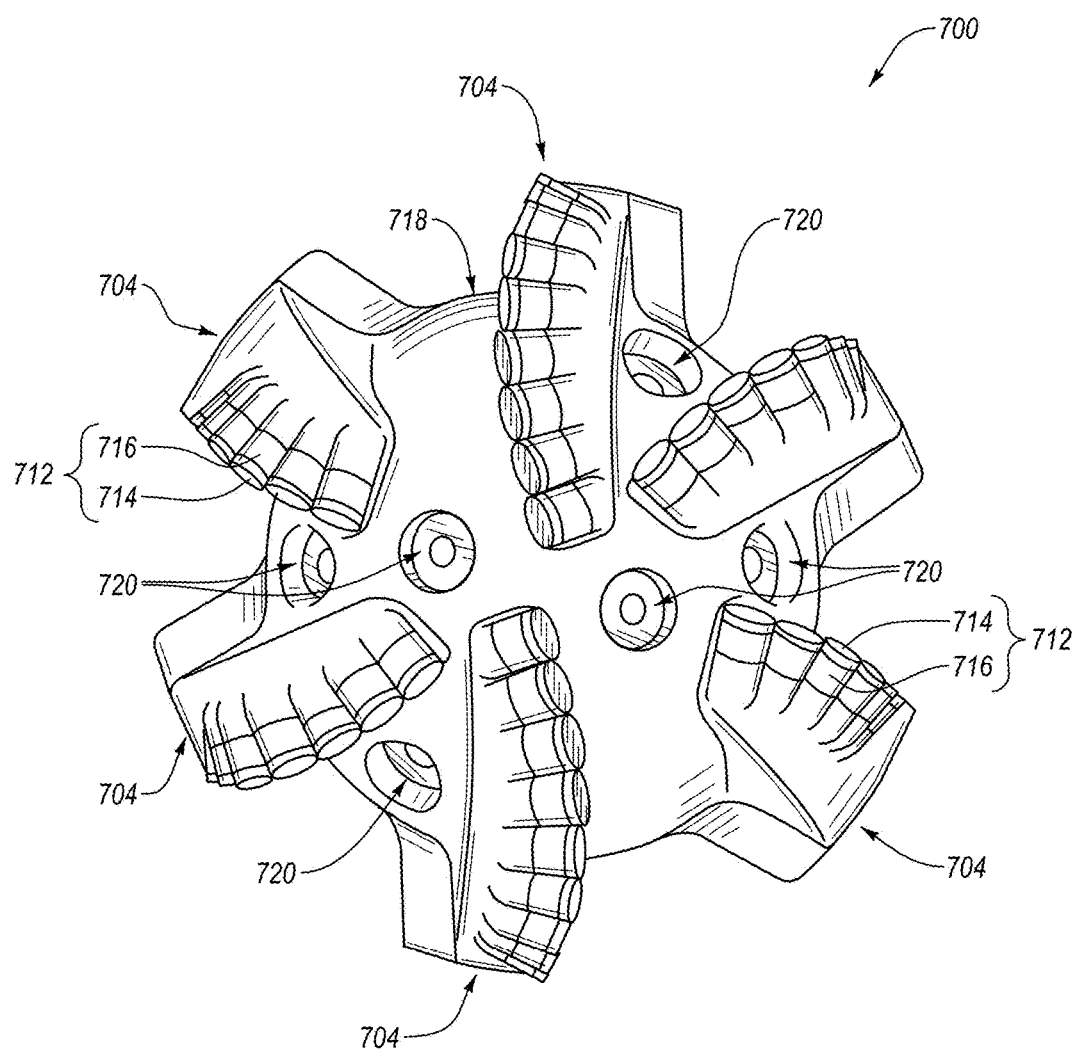
FIG. 7B is a top elevation view of the rotary drill bit shown in FIG. 7A.

FIGS. 7A and 7B are isometric and top elevation views, respectively, of a rotary drill bit 700 according to an embodiment. The rotary drill bit 700 includes at least one PDC cutting element configured according to any of the previously described leached PDC embodiments. The rotary drill bit 700 comprises a bit body 702 that includes radially and longitudinally extending blades 704 with leading faces 706, and a threaded pin connection 708 for connecting the bit body 702 to a drilling string. The bit body 702 defines a leading end structure configured for drilling into a subterranean formation by rotation about a longitudinal axis 710 and application of weight-on-bit. At least one PDC cutting element, manufactured and configured according to any of the previously described PDC embodiments, may be affixed to rotary drill bit 700 by, for example, brazing, mechanical affixing, or another suitable technique. With reference to FIG. 7B, each of a plurality of PDCs 712 is secured to the blades 704. For example, each PDC 712 may include a PCD table 714 bonded to a substrate 716. More generally, the PDCs 712 may comprise any PDC disclosed herein, without limitation. In addition, if desired, in an embodiment, a number of the PDCs 712 may be conventional in construction. Also, circumferentially adjacent blades 704 define so-called junk slots 718 therebetween, as known in the art. Additionally, the rotary drill bit 700 includes a plurality of nozzle cavities 720 for communicating drilling fluid from the interior of the rotary drill bit 700 to the PDCs 712.

FIGS. 7A and 7B merely depict one embodiment of a rotary drill bit that employs at least one PDC fabricated and structured in accordance with the disclosed embodiments, without limitation. The rotary drill bit 700 is used to represent any number of earth-boring tools or drilling tools, including, for example, core bits, roller-cone bits, fixed-cutter bits, eccentric bits, bicenter bits, reamers, reamer wings, or any other downhole tool including superabrasive compacts, without limitation.

Figure 8:
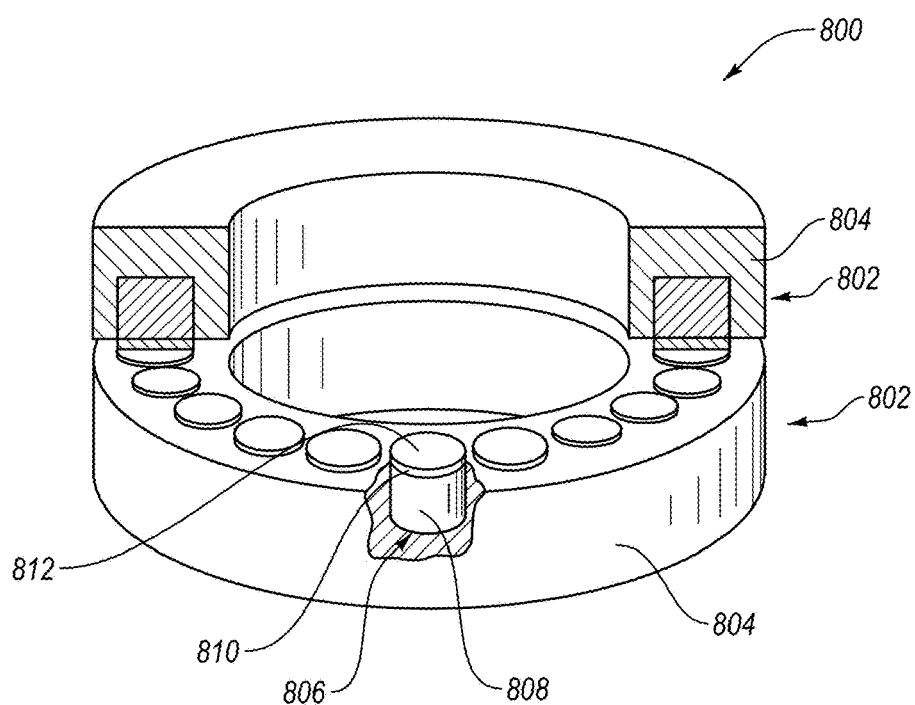
FIG. 8 is an isometric cut-away view of an embodiment of the thrust-bearing apparatus, which may utilize any of the disclosed PDC embodiments as bearing elements.
Figure 9:
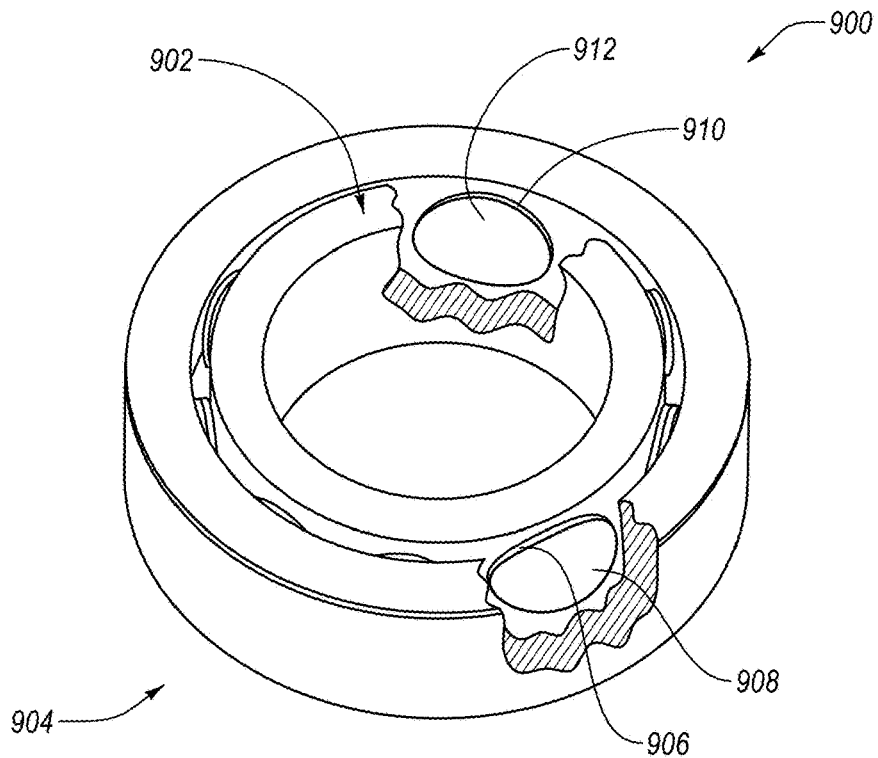
FIG. 9 is an isometric cut-away view of an embodiment of a radial bearing apparatus, which may utilize any of the disclosed PDC embodiments as bearing elements.

For example, FIGS. 8 and 9 disclose embodiments of thrust-bearing and radial bearing apparatuses, respectively. FIG. 8 is an isometric cut-away view of an embodiment of the thrust-bearing apparatus 800, which may utilize any of the disclosed PDC embodiments as bearing elements. The thrust-bearing apparatus 800 includes respective thrust-bearing assemblies 802. Each thrust-bearing assembly 802 includes an annular support ring 804 that may be fabricated from a material, such as carbon steel, stainless steel, or another suitable material. Each support ring 804 includes a plurality of recesses (not labeled) that receive a corresponding bearing element 806. Each bearing element 806 may be mounted to a corresponding support ring 804 within a corresponding recess by brazing, press-fitting, using fasteners, or another suitable mounting technique. One or more, or all of bearing elements 806 may be configured according to any of the disclosed PDC embodiments. For example, each bearing element 806 may include a substrate 808 and a PCD table 810, with the PCD table 810 including a bearing surface 812.

In use, the bearing surfaces 812 of one of the thrust-bearing assemblies 802 bear against the opposing bearing surfaces 812 of the other one of the bearing assemblies 802. For example, one of the thrust-bearing assemblies 802 may be operably coupled to a shaft to rotate therewith and may be termed a "rotor." The other one of the thrust-bearing assemblies 802 may be held stationary and may be termed a "stator."

FIG. 9 is an isometric cut-away view of an embodiment of a radial bearing apparatus 900, which may utilize any of the disclosed PDC embodiments as bearing elements. The radial bearing apparatus 900 includes an inner race 902 positioned generally within an outer race 904. The outer race 904 includes a plurality of bearing elements 910 affixed thereto that have respective bearing surfaces 912. The inner race 902 also includes a plurality of bearing elements 906 affixed thereto that have respective bearing surfaces 908. One or more, or all of the bearing elements 906 and 910 may be configured according to any of the PDC embodiments disclosed herein. The inner race 902 is positioned generally within the outer race 904, and thus the inner race 902 and outer race 904 may be configured so that the bearing surfaces 908 and 912 may at least partially contact one another and move relative to each other as the inner race 902 and outer race 904 rotate relative to each other during use.

The radial bearing apparatus 900 may be employed in a variety of mechanical applications. For example, so-called "roller-cone" rotary drill bits may benefit from a radial-bearing apparatus disclosed herein. More specifically, the inner race 902 may be mounted to a spindle of a roller cone and the outer race 904 may be mounted to an inner bore formed within a cone and such an outer race 904 and inner race 902 may be assembled to form a radial bearing apparatus.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A polycrystalline diamond element, comprising:
a body including a plurality of bonded diamond grains at least partially defining a plurality of interstitial regions, an upper surface, a back surface, and at least one lateral surface extending between the upper surface and the back surface, the body including:
  a first region extending inwardly from the upper surface and the at least one lateral surface, the first region exhibiting a first interstitial region concentration and including at least one interstitial constituent disposed in at least a portion of the plurality of interstitial regions of the first region, the at least one interstitial constituent including one or more of at least one metal carbonate or at least one metal oxide; and
  a second region extending inwardly from the back surface, the second region exhibiting a second interstitial region concentration that is greater than the first interstitial region concentration.

2. The polycrystalline diamond element of claim 1 wherein the at least one interstitial constituent is present at the upper surface of the polycrystalline diamond element in an amount of greater than 0 weight % to about 5 weight %.

3. The polycrystalline diamond element of claim 1 wherein the at least one interstitial constituent is present at the back surface of the polycrystalline diamond element in an amount of greater than 0 weight % to about 1.5 weight %.

4. The polycrystalline diamond element of claim 1 wherein the second interstitial region concentration is about 1.2 to about 1.5 times the first interstitial region concentration.

5. The polycrystalline diamond element of claim 1 wherein the second interstitial region concentration is about 2 to about 4 times the first interstitial region concentration.

6. The polycrystalline diamond element of claim 1 wherein the body exhibits a gradient of interstitial region concentration that increases from the first region toward the second region.

7. The polycrystalline diamond element of claim 1 wherein the plurality of bonded diamond grains exhibits a substantially uniform average diamond grain size.

8. The polycrystalline diamond element of claim 1 wherein:
the at least one metal carbonate includes one or more alkali metal carbonates, one or more alkaline earth metal carbonates, or combinations thereof; and
the at least one metal oxide includes one or more alkali metal oxides, one or more alkaline earth metal oxides, or combinations thereof.

9. A method of manufacturing at least one polycrystalline diamond element, the method comprising:
disposing a plurality of diamond particles adjacent to at least one carbonate catalyst material; and
sintering the plurality of diamond particles in the presence of the at least one carbonate catalyst material in a high-pressure high-temperature process effective to form the at least one polycrystalline diamond element, the at least one polycrystalline diamond element including:
  a body including a plurality of bonded diamond grains at least partially defining a plurality of interstitial regions, an upper surface, a back surface, and at least one lateral surface extending between the upper surface and the back surface, the body including:
  a first region extending inwardly from the upper surface and the at least one lateral surface, the first region exhibiting a first interstitial region concentration and including at least one interstitial constituent disposed in at least a portion of the plurality of interstitial regions of the first region, the at least one interstitial constituent including the one or more of at least one metal carbonate or at least one metal oxide; and
  a second region extending inwardly from the back surface, the second region exhibiting a second interstitial region concentration that is greater than the first interstitial region concentration.

10. The method of claim 9 wherein:
the at least one metal carbonate includes one or more alkali metal carbonates, one or more alkaline earth metal carbonates, or combinations thereof; and
the at least one metal oxide includes one or more alkali metal oxides, one or more alkaline earth metal oxides, or combinations thereof.

11. The method of claim 9 wherein the at least one interstitial constituent is present at the upper surface of the at least one polycrystalline diamond element in an amount of greater than 0 to about 5 weight %.

12. The method of claim 9 wherein the at least one interstitial constituent is present at the back surface of the at least one polycrystalline diamond element in an amount of greater than 0 to about 1.5 weight %.

13. The method of claim 9 wherein the second interstitial region concentration is about 1.2 to about 1.5 times the first interstitial region concentration.

14. The method of claim 13, further comprising infiltrating at least a portion of the plurality of interstitial regions of the second region of the at least one polycrystalline diamond element with a metallic infiltrant, wherein the metallic infiltrant includes one or more of a braze alloy, cobalt, iron, nickel, or alloys of at least one of cobalt, iron, or nickel.

15. The method of claim 14, prior to infiltrating at least a portion of the plurality of interstitial regions of the second region, heat treating the at least one polycrystalline diamond element to at least partially convert at least some of the at least one metal carbonate to the at least one metal oxide.

16. The method of claim 9 wherein:
disposing a plurality of diamond particles adjacent to at least one carbonate catalyst material includes disposing the at least one carbonate catalyst material between a first plurality of diamond particles and a second plurality of diamond particles to form an assembly; and
sintering a plurality of diamond particles in the presence of the at least one carbonate catalyst material in a high-pressure/high-temperature process includes subjecting the assembly to high-pressure/high-temperature processing effective to infiltrate the first and second plurality of diamond particles with respective portions of the at least one carbonate catalyst material and form corresponding first and second polycrystalline diamond elements.

17. The method of claim 9, further comprising leaching at least a portion of the body of the at least one polycrystalline diamond element.

18. A rotary drill bit, comprising:

a bit body configured to engage a subterranean formation; and a plurality of polycrystalline diamond cutting elements affixed to the bit body, at least one of the plurality of polycrystalline diamond cutting elements including:

a body including a plurality of bonded diamond grains at least partially defining a plurality of interstitial regions, an upper surface, a back surface, and at least one lateral surface extending between the upper surface and the back surface, the body including:

a first region extending inwardly from the upper surface and the at least one lateral surface, the first region exhibiting a first interstitial region concentration and including at least one interstitial constituent disposed in at least a portion of the plurality of interstitial regions of the first region, the at least one interstitial constituent including one or more of at least one metal carbonate or at least one metal oxide; and a second region extending inwardly from the back surface, the second region exhibiting a second interstitial region concentration that is greater than the first interstitial region concentration.

19. The rotary drill bit of claim 18 wherein the at least one interstitial constituent is present at the upper surface of the at least one of the plurality of polycrystalline diamond cutting elements in an amount of greater than 0 weight % to about 5 weight %, and wherein the at least one interstitial constituent is present at the back surface of the at least one of the plurality of polycrystalline diamond cutting elements in an amount of greater than 0 weight % to about 1.5 weight %.

20. The rotary drill bit of claim 18 wherein the second interstitial region concentration is about 1.2 to about 1.5 times the first interstitial region concentration.

21. The rotary drill bit of claim 18 wherein the second interstitial region concentration is about 2 to about 4 times the first interstitial region concentration.

* * * * *